(12) United States Patent
Sromin et al.

(10) Patent No.: US 10,018,723 B2
(45) Date of Patent: *Jul. 10, 2018

(54) DUAL-AXIS SCANNING MIRROR

(71) Applicant: APPLE INC., Cupertino, CA (US)

(72) Inventors: Alexander Sromin, Ashdod (IL); Naftali Chayat, Kfar Saba (IL); Raviv Erlich, Rehovot (IL); Yuval Gerson, Tel-Mond (IL); Alexander Shpunt, Tel Aviv (IL); Raviv Weber, Herzliya (IL)

(73) Assignee: APPLE INC., Cupertino, CA (US)

( * ) Notice: Subject to any disclaimer, the term of this patent is extended or adjusted under 35 U.S.C. 154(b) by 738 days.

This patent is subject to a terminal disclaimer.

(21) Appl. No.: 14/416,296

(22) PCT Filed: Jul. 25, 2013

(86) PCT No.: PCT/IB2013/056101
§ 371 (c)(1),
(2) Date: Jan. 22, 2015

(87) PCT Pub. No.: WO2014/016794
PCT Pub. Date: Jan. 30, 2014

(65) Prior Publication Data
US 2015/0260847 A1    Sep. 17, 2015

Related U.S. Application Data

(60) Provisional application No. 61/675,828, filed on Jul. 26, 2012, provisional application No. 61/835,655, filed on Jun. 17, 2013.

(51) Int. Cl.
*G01C 3/08* (2006.01)
*G01S 17/89* (2006.01)
(Continued)

(52) U.S. Cl.
CPC ............ *G01S 17/89* (2013.01); *G01S 7/4817* (2013.01); *G02B 26/085* (2013.01); *G02B 26/101* (2013.01); *H02K 33/16* (2013.01)

(58) Field of Classification Search
CPC .... G02B 26/085; G02B 26/101; H02K 33/16; G01S 17/89; G01S 7/4817
(Continued)

(56) References Cited

U.S. PATENT DOCUMENTS 3,918,068 A    11/1975    Reinke et al.
4,003,626 A    1/1977    Reinke et al.
(Continued)

FOREIGN PATENT DOCUMENTS

CN    1379278 A    11/2002
CN    1740843 A    3/2006
(Continued)

OTHER PUBLICATIONS

CN Application # 201380039521.1 Office Action dated Jun. 3, 2016.
(Continued)

*Primary Examiner* — Mark Hellner
(74) *Attorney, Agent, or Firm* — D. Kligler IP Services Ltd.

(57) ABSTRACT

Optical apparatus (64) includes a stator assembly (47), which includes a core (78, 90, 91) containing an air gap and one or more coils (80, 92, 94, 116, 120) including conductive wire wound on the core so as to cause the core to form a magnetic circuit through the air gap in response to an electrical current flowing in the conductive wire. A scanning mirror assembly (45, 83, 85, 130) includes a support structure (68), a base (72), which is mounted to rotate about a first axis relative to the support structure, and a mirror (46), which is mounted to rotate about a second axis relative to the (Continued)

base. At least one rotor (76, 132) includes one or more permanent magnets, which are fixed to the scanning mirror assembly and which are positioned in the air gap so as to move in response to the magnetic circuit. A driver (82) is coupled to generate the electrical current in the one or more coils.

17 Claims, 13 Drawing Sheets

(51) Int. Cl.
*H02K 33/16* (2006.01)
*G02B 26/08* (2006.01)
*G02B 26/10* (2006.01)
*G01S 7/481* (2006.01)

(58) Field of Classification Search
USPC .................................................... 356/5.01
See application file for complete search history.

(56) References Cited

U.S. PATENT DOCUMENTS

| | | | |
|---|---|---|---|
| 5,742,419 | A | 4/1998 | Dickensheets et al. |
| 5,938,989 | A | 8/1999 | Hambright |
| 6,044,705 | A | 4/2000 | Neukermans et al. |
| 6,140,979 | A | 10/2000 | Gerhard et al. |
| 6,245,590 | B1 | 6/2001 | Wine et al. |
| 6,517,751 | B1 | 2/2003 | Hambright |
| 6,714,336 | B2 | 3/2004 | Orcutt et al. |
| 6,924,915 | B2 | 8/2005 | Hirose et al. |
| 6,924,966 | B2 | 8/2005 | Prophet |
| 7,295,726 | B1 | 11/2007 | Milanovic et al. |
| 7,833,430 | B2 | 11/2010 | Mi et al. |
| 7,952,781 | B2 | 5/2011 | Weiss et al. |
| 8,018,579 | B1 | 9/2011 | Krah |
| 8,437,063 | B2 * | 5/2013 | Weiss ............... H04N 3/08 359/201.1 |
| 8,797,623 | B2 | 8/2014 | Weiss et al. |
| 8,810,879 | B2 * | 8/2014 | Lubianiker ....... G02B 26/0841 359/199.1 |
| 9,304,316 | B2 * | 4/2016 | Weiss ............... H04N 3/08 |
| 2001/0050801 | A1 | 12/2001 | Behin et al. |
| 2002/0071169 | A1 | 6/2002 | Bowers et al. |
| 2002/0181069 | A1 | 12/2002 | Brown et al. |
| 2003/0162313 | A1 | 8/2003 | Kim et al. |
| 2004/0004775 | A1 | 1/2004 | Turner |
| 2004/0007069 | A1 | 1/2004 | Turner et al. |
| 2004/0040648 | A1 | 3/2004 | Harden et al. |
| 2004/0063235 | A1 | 4/2004 | Chang |
| 2004/0070816 | A1 | 4/2004 | Kato et al. |
| 2004/0207744 | A1 | 10/2004 | Bock |
| 2004/0214350 | A1 | 10/2004 | Pan et al. |
| 2004/0223195 | A1 | 11/2004 | Nomura |
| 2005/0157375 | A1 | 7/2005 | Doan et al. |
| 2008/0143196 | A1 | 6/2008 | Sprague et al. |
| 2008/0225368 | A1 | 9/2008 | Ciabattoni et al. |
| 2009/0042366 | A1 | 2/2009 | Grivna |
| 2009/0284817 | A1 | 11/2009 | Orcutt |
| 2010/0046054 | A1 | 2/2010 | Jeong et al. |
| 2010/0302617 | A1 | 12/2010 | Zhou |
| 2011/0188054 | A1 | 8/2011 | Petronius et al. |
| 2011/0228367 | A1 | 9/2011 | Lubianiker et al. |
| 2011/0277813 | A1 | 11/2011 | Rogers et al. |
| 2011/0279648 | A1 | 11/2011 | Lutian et al. |
| 2011/0310125 | A1 | 12/2011 | McEldowney et al. |
| 2011/0310452 | A1 | 12/2011 | Lin |
| 2012/0105936 | A1 * | 5/2012 | Tsuboi ............. B81B 3/0078 359/290 |
| 2012/0140312 | A1 | 6/2012 | Miles et al. |
| 2012/0236379 | A1 | 9/2012 | Dasilva et al. |
| 2012/0286378 | A1 | 11/2012 | Lee |
| 2013/0206967 | A1 | 8/2013 | Shpunt et al. |
| 2013/0207970 | A1 | 8/2013 | Shpunt et al. |
| 2014/0153001 | A1 | 6/2014 | Chayat et al. |
| 2014/0291491 | A1 | 10/2014 | Shpunt et al. |
| 2014/0291496 | A1 | 10/2014 | Shpunt et al. |
| 2014/0310914 | A1 | 10/2014 | Erlich et al. |
| 2014/0313519 | A1 | 10/2014 | Erlich et al. |
| 2014/0327945 | A1 | 11/2014 | Weiss et al. |

FOREIGN PATENT DOCUMENTS

| | | |
|---|---|---|
| CN | 1755495 A | 4/2006 |
| CN | 101093282 A | 12/2007 |
| EP | 2333603 A1 | 6/2011 |
| EP | 1719012 B1 | 3/2012 |
| EP | 1723460 B1 | 7/2014 |
| GB | 2271436 A | 4/1994 |
| JP | 2004191918 A | 7/2004 |
| WO | 0212925 A2 | 2/2002 |
| WO | 2002047241 A1 | 6/2002 |
| WO | 03012491 A2 | 2/2003 |
| WO | 03/049156 A2 | 6/2003 |
| WO | 2004000720 A1 | 12/2003 |
| WO | 2012/020380 A1 | 2/2012 |
| WO | 2014064606 A1 | 5/2014 |

OTHER PUBLICATIONS

U.S. Appl. No. 14/350,580 Office Action dated May 2, 2016.
European Application # 10192429-8 Search Report dated Jul. 13, 2015.
U.S. Appl. No. 14/350,580 Office Action dated Sep. 18, 2015.
U.S. Appl. No. 14/298,925 Office Action dated Oct. 6, 2015.
Judy et al., "Magnetic Microactuation of Polysilicon Flexure Structures," Solid-State Sensor and Actuator Workshop, year 1994.
Judy et al., "Magnetically Actuated, Addressable Microstructures," Journal of Microelectromechanical Systems, vol. 6, No. 3, pp. 249-256, Sep. 1997.
Cho et al., "A Scanning Micromirror Using a Bi-Directionally Movable Magnetic Microactuator," Proceedings of SPIE, MOEMS and Miniaturized Systems, vol. 4178, pp. 106-115, USA 2000.
Hamamatsu Photonics K.K., "Position sensitive detectors", Japan, Feb. 2010.
Gale, M.T., "Replication Technology for Diffractive Optical Elements", Proceedings of SPIE, vol. 3010, pp. 111-123, May 15, 1997.
Kolste et al., "Injection Molding for Diffractive Optics", Proceedings of SPIE, vol. 2404, pp. 129-131, Feb. 9, 1995.
Gale et al., "Replicated Microstructures for Integrated Topics", Proceedings of SPIE, vol. 2513, pp. 2-10, Aug. 29, 1994.
Jahns et al., "Diffractive Optics and Micro-Optics: Introduction to the Feature Issue", Applied Optics Journal, vol. 36, No. 20, pp. 4633-4634, Jul. 10, 1997.
Nikolejeff et al., "Replication of Continuous Relief Diffractive Optical Elements by Conventional Compact Disc Injection-Molding Techniques", Applied Optics Journal, vol. 36, No. 20, pp. 4655-4659, Jul. 10, 1997.
Neyer et al., "New Fabrication Technology for Polymer Optical Waveguides", Integrated Photonics Research, pp. 248-249, year 1992.
Neyer et al., "Fabrication of Low Loss Polymer Waveguides Using Injection Moulding Technology", Electronics Letters, vol. 29, No. 4, pp. 399-401, Feb. 18, 1993.
Optical Society of America, "Diffractive Optics and Micro-Optics", 1996 Technical Digest Series, vol. 5, Boston, USA, Apr. 29-May 2, 1996.
Lintec Corporation, "Adwill D-510T Tape", Japan, Apr. 4, 2006.
Stark, B., "MEMS Reliability Assurance Guidelines for Space Applications", Jet Propulsion Laboratory, California Institute of Technology, Pasadena, USA, Jan. 1999.
International Application PCT/IL2005/001194 Search Report dated Jun. 6, 2006.
Pal et al., "A Novel Process for Perfect Convex Corner Realization in Bulk Micromachining", Journal of Micromechanics and Microengineering, vol. 14, No. 10, pp. 1416-1420, Jul. 23, 2004.

(56) References Cited

OTHER PUBLICATIONS

International Application PCT/IB2013/051985 Search Report dated Jul. 22, 2013.
Fujita et al., "Dual-Axis MEMS Mirror for Large Deflection-Angle Using SU-8 Soft Torsion Beam," Sensors and Actuators A: Physical, vol. 121, issue 1, pp. 16-21, May 2005.
Stone et al., "Performance Analysis of Next-Generation LADAR for Manufacturing, Construction, and Mobility", National Institute of Standards and Technology, document # NISTIR 7117, Gaithersburg, USA, May 2004.
European Patent Application # 12155674.0 Search Report dated May 3, 2013.
International Patent Application # PCT/IB2013/056101 Search Report dated Dec. 17, 2013.
International Application PCT/IB2013/051189 Search Report dated Jun. 18, 2013.
International Application PCT/IB2013/059531 Search Report dated Mar. 25, 2014.
AU Application # 2015100178 Office Action dated Apr. 17, 2015.
European Application # 05804455.3 Office Action dated Sep. 29, 2016.
U.S. Appl. No. 14/350,580 Office Action dated Nov. 6, 2015.
U.S. Appl. No. 14/350,580 Office Action dated Feb. 1, 2016.
AU Application # 2013294616 Office Action dated Jan. 8, 2016.
CN Application # 201380055371.3 office action dated Oct. 11, 2017.

\* cited by examiner

DUAL-AXIS SCANNING MIRROR

CROSS-REFERENCE TO RELATED APPLICATIONS

This patent application claims the benefit of U.S. Provisional Patent Application 61/675,828, filed Jul. 26, 2012, and of U.S. Provisional Patent Application 61/835,655, filed Jun. 17, 2013. This patent application is also related to U.S. patent application Ser. No. 13/766,801, filed Feb. 14, 2013, to U.S. patent application Ser. No. 13/798,251, filed Mar. 13, 2013. All of the above related applications are incorporated herein by reference.

FIELD OF THE INVENTION

The present invention relates generally to optical scanning.

BACKGROUND

Various methods are known in the art for optical 3D mapping, i.e., generating a 3D profile of the surface of an object by processing an optical image of the object. This sort of 3D profile is also referred to as a 3D map, depth map or depth image, and 3D mapping is also referred to as depth mapping.

PCT Patent Application PCT/IB2011/053560, which is assigned to the assignee of the present patent application and whose disclosure is incorporated herein by reference, describes apparatus for mapping, which includes an illumination module. This module includes a radiation source, which is configured to emit a beam of radiation, and a scanner, which is configured to receive and scan the beam over a selected angular range. Illumination optics are configured to project the scanned beam so as to create a pattern of spots extending over a region of interest. An imaging module is configured to capture an image of the pattern that is projected onto an object in the region of interest. A processor is configured to process the image in order to construct a three-dimensional (3D) map of the object.

U.S. Patent Application Publication 2011/0279648, whose disclosure is incorporated herein by reference, describes a method for constructing a 3D representation of a subject, which comprises capturing, with a camera, a 2D image of the subject. The method further comprises scanning a modulated illumination beam over the subject to illuminate, one at a time, a plurality of target regions of the subject, and measuring a modulation aspect of light from the illumination beam reflected from each of the target regions. A moving-mirror beam scanner is used to scan the illumination beam, and a photodetector is used to measure the modulation aspect. The method further comprises computing a depth aspect based on the modulation aspect measured for each of the target regions, and associating the depth aspect with a corresponding pixel of the 2D image.

U.S. Pat. No. 8,018,579, whose disclosure is incorporated herein by reference, describes a three-dimensional imaging and display system in which user input is optically detected in an imaging volume by measuring the path length of an amplitude modulated scanning beam as a function of the phase shift thereof. Visual image user feedback concerning the detected user input is presented.

U.S. Pat. No. 7,952,781, whose disclosure is incorporated herein by reference, describes a method of scanning a light beam and a method of manufacturing a microelectromechanical system (MEMS), which can be incorporated in a scanning device. In a disclosed embodiment, a rotor assembly having at least one micromirror is formed with a permanent magnetic material mounted thereon, and a stator assembly has an arrangement of coils for applying a predetermined moment on the at least one micromirror.

Further MEMS mirror assemblies with magnetic drives are described, for example, in U.S. Patent Application Publications US 2008/0143196, US 2009/0284817, and US 2010/0046054.

SUMMARY

Embodiments of the present invention that are described hereinbelow provide optical scanners with enhanced performance and capabilities.

There is therefore provided, in accordance with an embodiment of the present invention, optical apparatus, including a stator assembly, which includes a core containing an air gap and one or more coils including conductive wire wound on the core so as to cause the core to form a magnetic circuit through the air gap in response to an electrical current flowing in the conductive wire. A scanning mirror assembly includes a support structure, a base, which is mounted to rotate about a first axis relative to the support structure, and a mirror, which is mounted to rotate about a second axis relative to the base. At least one rotor includes one or more permanent magnets, which are fixed to the scanning mirror assembly and which are positioned in the air gap so as to move in response to the magnetic circuit. A driver is coupled to generate the electrical current in the one or more coils at one or more frequencies selected so that motion of the at least one rotor, in response to the magnetic circuit, causes the base to rotate about the first axis at a first frequency while causing the mirror to rotate about the second axis at a second frequency.

In one embodiment, the mirror is weighted asymmetrically about at least the first axis so as to couple a first rotation of the mirror about the first axis to a second rotation of the base about the second axis. Typically, the second frequency is a resonant frequency of rotation of the mirror about the second axis, and the driver is coupled to generate the electrical current at the first frequency.

In some embodiments, the core includes first and second pairs of pole pieces, defining the air gap, and the at least one rotor includes first and second rotors, which are respectively fixed to opposing first and second sides of the base and are respectively positioned in the air gap between the first and second pairs of the pole pieces. In a disclosed embodiment, the drive circuit is configured to drive the one or more coils with a first current at the first frequency and a second current at the second frequency. Typically, the one or more coils include first coils wound adjacent to the pole pieces in the first pair and second coils wound adjacent to the pole pieces in the second pair, and the drive circuit is configured to drive the first and second coils in phase at the first frequency and in opposing phases at the second frequency.

In certain disclosed embodiments, the core includes a tooth, which protrudes between the pole pieces and has an upper end that adjoins and contains the air gap. Typically, the core includes a base, from which the pole pieces and the tooth protrude toward the air gap. The one or more coils may include first coils wound adjacent to the pole pieces and a second coil wound on the tooth, wherein the drive circuit is configured to drive the first coils at the first frequency and the second coil at the second frequency. In one embodiment, the core includes a plurality of fingers, which surround the tooth and protrude toward the air gap between the tooth and the pole pieces.

In some embodiments, the one or more permanent magnets of the at least one rotor include first and second permanent magnets fixed to the base on opposing sides of the mirror. In one embodiment, the first and second permanent magnets have a rectangular shape. Additionally or alternatively, each of the first and second permanent magnets includes respective upper and lower pieces, which are mounted on opposing surfaces of the base so that a center of mass of the first and second permanent magnets is located on the first axis.

Further additionally or alternatively, the one or more permanent magnets of the at least one rotor may include at least a third permanent magnet fixed to the mirror. The at least third permanent magnet may be recessed within a surface of the mirror.

In disclosed embodiments, the scanning mirror assembly includes a silicon wafer formed as a microelectromechanical systems (MEMS) device, which includes first spindles, etched from the silicon wafer, connecting the base to the substrate along the first axis and second spindles, etched from the silicon wafer, connecting the mirror to the base along the second axis. Typically, the second spindles are formed so that the mirror rotates resonantly about the second axis at the second frequency, while the first spindles are formed so that rotation of the base about the first spindles is a non-resonant rotation. The wafer may be thinned in a vicinity of the first spindles so as to increase a flexibility of the first spindles.

In a disclosed embodiment, the apparatus includes a transmitter, which is configured to direct pulses of light to reflect from the mirror while the mirror and the base rotate, whereby the light is scanned over a scene. A receiver is configured to receive the pulses of the light reflected from the scene so as to measure a time of flight of the pulses.

There is also provided, in accordance with an embodiment of the present invention, optical apparatus, which includes a mirror assembly, including a mirror, which is mounted to rotate about an axis relative to a support structure. A capacitive sensor includes at least first and second plates, which are positioned in proximity to the mirror on opposite sides of the axis and are angled relative to a plane of the support structure such that the plates are closest to the plane in a location adjacent to the axis and slope away from the plane at locations farther from the axis.

In a disclosed embodiment, the mirror is mounted so as to rotate about first and second axes, which are mutually perpendicular, and the at least first and second plates of the capacitive sensor include four plates, which together define a pyramidal shape, having a peak adjacent to a center point at which the axes intersect.

There is additionally provided, in accordance with an embodiment of the present invention, a method for scanning, which includes providing a stator assembly, which includes a core containing an air gap, and one or more coils including conductive wire wound on the core so as to cause the core to form a magnetic circuit through the air gap in response to an electrical current flowing in the conductive wire. A scanning mirror assembly is provided, including a support structure, a base, which is mounted to rotate about a first axis relative to the support structure, and a mirror, which is mounted to rotate about a second axis relative to the base. At least one rotor, which includes one or more permanent magnets, is fixed to the scanning mirror assembly. The scanning mirror assembly is mounted on the stator assembly so that the one or more permanent magnets are positioned in the air gap so as to move in response to the magnetic circuit. The one or more coils are driven with an electrical current at one or more frequencies selected so that motion of the at least one rotor, in response to the magnetic circuit, causes the base to rotate about the first axis at a first frequency while causing the mirror to rotate about the second axis at a second frequency.

There is further provided, in accordance with an embodiment of the present invention, a method for monitoring, which includes mounting a mirror to rotate about an axis relative to a support structure. At least first and second plates of a capacitive sensor are positioned in proximity to the mirror on opposite sides of the axis, while angling the plates relative to a plane of the support structure such that the plates are closest to the plane in a location adjacent to the axis and slope away from the plane at locations farther from the axis. Changes in a capacitance between the plates and the mirror are measured so as to monitor rotation of the mirror.

The present invention will be more fully understood from the following detailed description of the embodiments thereof, taken together with the drawings in which:

DETAILED DESCRIPTION OF EMBODIMENTS

Overview

The above-mentioned U.S. patent application Ser. No. 13/766,801 describes depth engines that generate 3D mapping data by measuring the time of flight of a scanning beam. A light transmitter, such as a laser, directs short pulses of light toward a scanning mirror, which scans the light beam over a scene of interest. A receiver, such as a sensitive, high-speed photodiode (for example, an avalanche photodiode) receives light returned from the scene via the same scanning mirror. Processing circuitry measures the time delay between the transmitted and received light pulses at each point in the scan. This delay is indicative of the distance traveled by the light beam, and hence of the depth of the object at the point. The processing circuitry uses the depth data thus extracted in producing a 3D map of the scene.

When using this sort of scanning system for 3D mapping, as well as other scanning applications, it is desirable that the mirror scan mechanically about at least one axis at high frequency (for example, in the range of 2-30 kHz) and over large angles (typically ±10-25°). The scan range about the second scan axis may be even larger, but the scan frequency is typically much lower (for example, in the range of 15-100 Hz). The two scan directions are coordinated to generate a raster pattern that covers the region being scanned. The above-mentioned patent applications describe gimbaled micro-mirror mounts and magnetic driving arrangements that can be used in this sort of raster generation.

Embodiments of the present invention that are described herein provide enhancements to these magnetic driving arrangements that are particularly useful in achieving efficient scanning over a wide angular range in the high-frequency scan direction. In the disclosed embodiments, a micromirror is mounted on a miniature gimbaled base, so that the base rotates relative to a support structure in the low-frequency (slow) scan direction, while the micromirror itself rotates relative to the base in the high-frequency (fast) scan direction. (The term "micromirror" is used herein simply to refer to very small mirrors, which are typically no more than a few millimeters across, although it may be possible to apply the principles of the present invention to larger mirrors.) The same magnetic drive can be used to power both the fast and slow scans. Energy may be coupled into the fast scan direction by mechanical coupling between the mirror and the base. Additionally or alternatively, the magnetic field of the drive may be dynamically shaped, by providing appropriate driving currents, in order to exert alternating magnetic forces on the mirror and the base at different frequencies and in different directions so as to give the desired pattern of motion.

System Description

Figure 1:
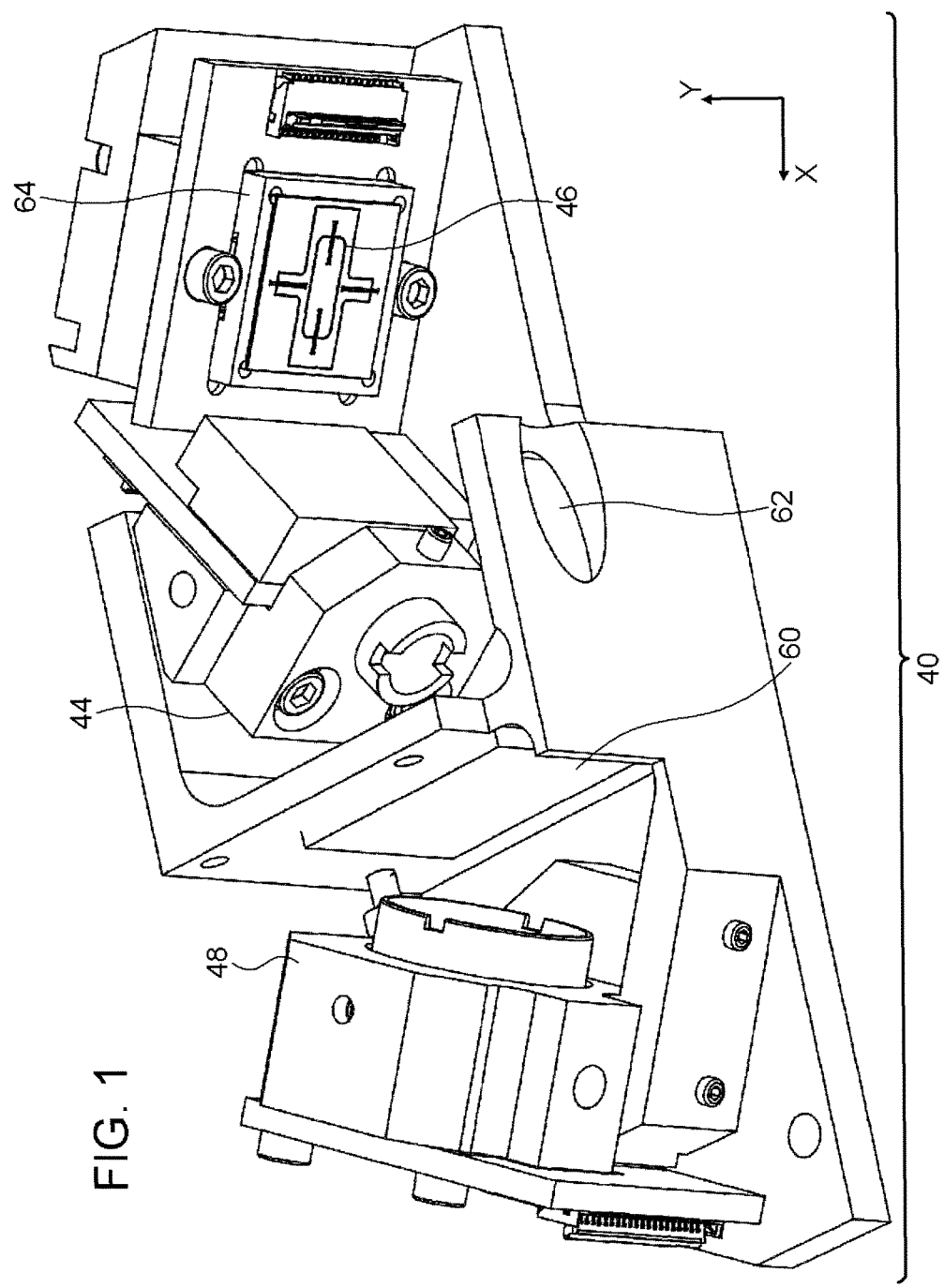
FIG. 1 is a schematic, pictorial illustration of an optical scanning head, in accordance with an embodiment of the present invention.

FIG. 1 schematically illustrates elements of an optical head 40 that is used in the system described in the above-mentioned U.S. patent application Ser. No. 13/766,801. The performance of this optical head may be enhanced by incorporation of a gimbaled mirror with magnetic drive as described below. A transmitter 44 emits pulses of light toward a polarizing beamsplitter 60. Typically, only a small area of the beamsplitter, directly in the light path of transmitter 44, is coated for reflection, while the remainder of the beamsplitter is fully transparent in the transmitted wavelength range (or even anti-reflection coated for it) to permit returned light to pass through to a receiver 48. The light from transmitter 44 reflects off beamsplitter 60 and then a folding mirror 62 toward a scanning micromirror 46. The area of the micromirror may be about 12 mm$^2$, for example. A MEMS scanner 64 scans the micromirror in X- and Y-directions with the desired scan frequency and amplitude. Details of the micromirror and scanner are shown in the figures that follow.

Light pulses returned from the scene strike micromirror 46, which reflects the light via folding mirror 62 through beamsplitter 60. Receiver 48 senses the returned light pulses and generates corresponding electrical pulses. To enhance sensitivity of detection, it is desirable that the active mirror size, the overall area of beamsplitter 60 and the aperture of receiver 48 be considerably larger than the area of the transmitted beam. To limit the amount of unwanted ambient light that reaches receiver 48, a bandpass filter (not shown) may be incorporated in the receiver path, possibly on the same substrate as beamsplitter 60.

The specific mechanical and optical designs of the optical head shown in FIG. 1 are described here by way of example, and alternative designs implementing similar principles are considered to be within the scope of the present invention.

Figure 2:
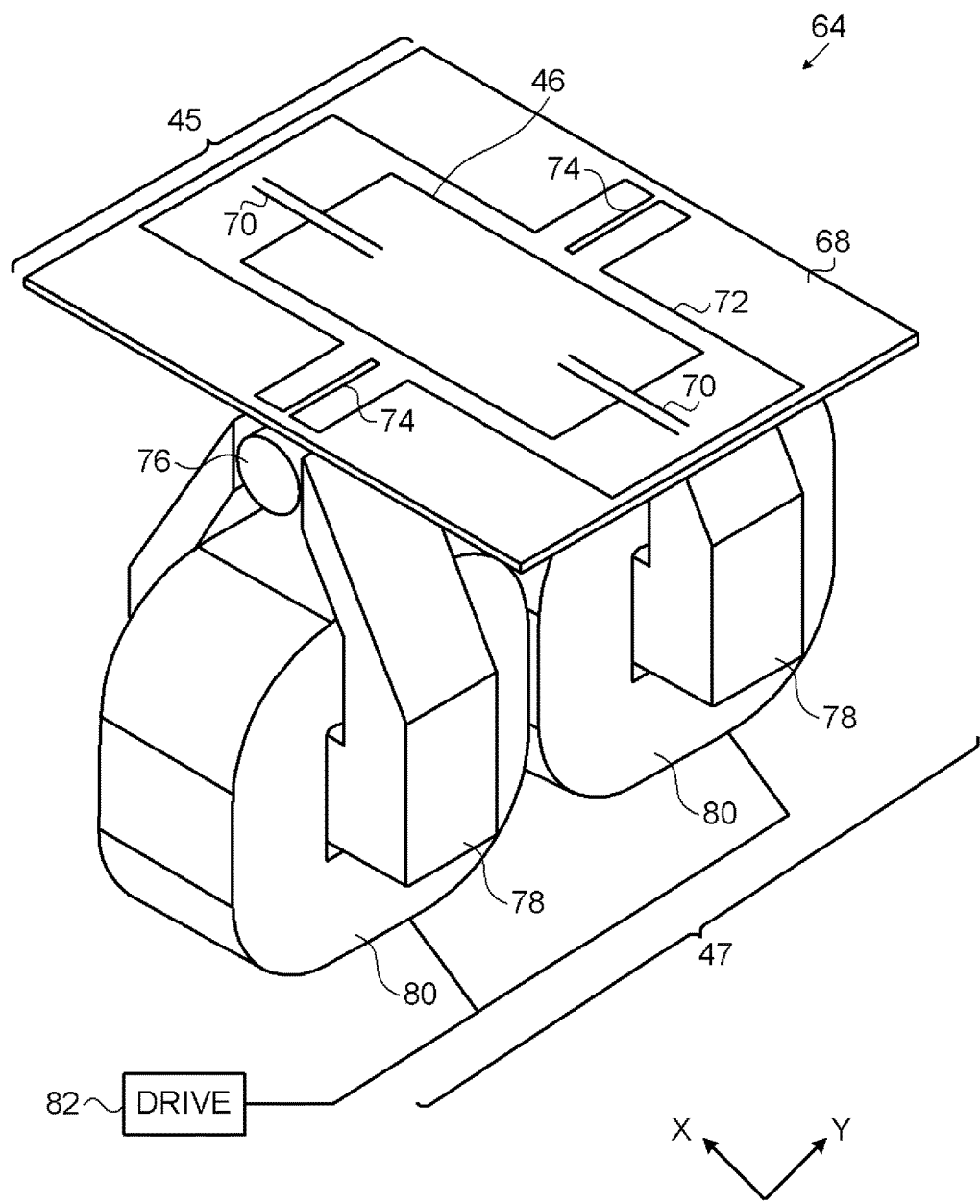
FIG. 2 is a schematic, pictorial illustration of a MEMS scanner, in accordance with an embodiment of the present invention.

FIG. 2 is a schematic, pictorial illustration of MEMS scanner 64, in accordance with an embodiment of the present invention. This scanner is produced and operates on principles similar to those described in the above-mentioned U.S. Pat. No. 7,952,781, but enables two-dimensional scanning of a single micromirror 46. (The pictured arrangement may be used, mutatis mutandis, to drive an array of micromirrors, as described in the above-mentioned U.S. patent application Ser. No. 13/798,251.) A micromirror assembly 45, which includes micromirror 46, is produced by suitably etching a semiconductor substrate 68 to separate the micromirror from a base 72 (also referred to as a gimbal), and to separate the base from the remaining substrate 68, which serves as a support structure. After etching, micromirror 46 (to which a suitable reflective coating is applied) is able to rotate about the X-axis (to scan the reflected spot in the Y-direction) relative to support 72 on spindles 70, while base 72 rotates about the Y-axis (to scan the spot in the X-direction) relative to substrate 68 on spindles 74.

Micromirror 46 and base 72 are mounted on a pair of rotors 76, which comprise permanent magnets. (Only one of the rotors is visible in this figure.) Rotors 76 are suspended in respective air gaps between the pole pieces of magnetic cores 78 in a stator assembly 47 (also referred to simply as the stator of scanner 64). Cores 78 are wound with respective coils 80 of conductive wire, thus creating an electromagnetic stator assembly. Although a single coil per core is shown in FIG. 2 for the sake of simplicity, two or more coils may alternatively be wound on each core; coils may be wound at different places on the cores; and different core shapes may also be used, as shown in the figures that follow.

A drive circuit 82 (referred to for short as a driver) drives an electrical current through coils 80 so as to generate a magnetic circuit through cores 78 that passes through the air gaps. Typically, drive circuit 82 comprises a frequency generator, which generates electrical signals at the desired frequency or frequencies, along with suitable amplifiers to provide the desired current levels to the coils. The magnetic field generated in the air gaps of the coils interacts with the magnetization of rotors 76 and thus causes the rotors to move within the air gaps.

Specifically, in this embodiment, coils 80 may be driven with high-frequency differential currents so as to cause micromirror 46 to rotate resonantly back and forth about spindles 70 at high frequency (typically in the range of 2-30 kHz, as noted above). This resonant rotation generates the high-speed Y-direction raster scan of the output beam from optical head 40. At the same time, coils 80 are driven together at lower frequency to drive the X-direction scan by rotation of base 72 about spindles 74 through the desired scan range. (In accordance with the corresponding speeds of rotations about the axes, the X-axis in the embodiments described herein is also referred to as the "fast axis," while the Y-axis is referred to as the "slow axis.") Alternatively, other stator configurations and drive schemes, some of which are illustrated in the figures that follow, may be used for these purposes. The X- and Y-rotations together generate the overall raster scan pattern of micromirror 46.

Assembly of optical head 40 from discrete optical and mechanical components, as shown in FIG. 1, requires precise alignment and can be costly. In alternative embodiments, all parts requiring precise placement and alignment (such as the light transmitter, receiver, and associated optics) may be combined in a single integrated package on a silicon optical bench (SiOB). This approach can save costs and may make the optical head easier to handle. Various alternative designs of these sorts are shown in the above-mentioned U.S. patent application Ser. No. 13/766,801.

Scan Coupling Using Mechanical Asymmetry

Figure 3A:
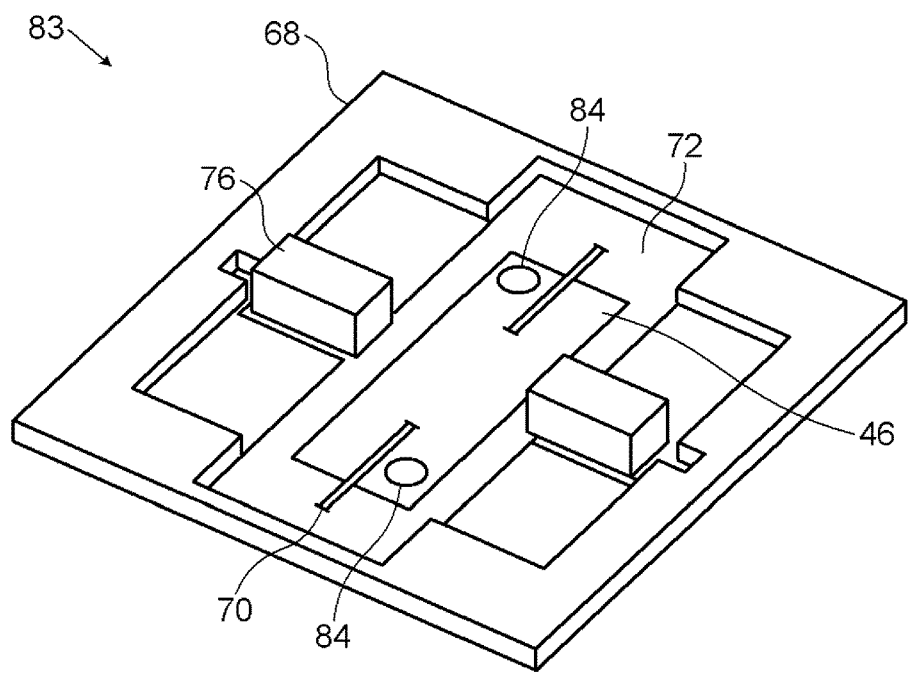
FIG. 3A is a schematic bottom view of a micromirror assembly, in accordance with an embodiment of the present invention.

FIG. 3A is a schematic bottom view of a micromirror assembly 83, showing a scheme for mechanically driving the high-speed Y-direction scan of micromirror 46, in accordance with an embodiment of the present invention. Magnetic rotors 76 appear as rectangular structures in this figure, as opposed to the cylindrical rotor shown in FIG. 2, but perform the identical function. Spindles 70 in FIG. 3A are aligned with the X-axis as shown in FIG. 2, while spindles 74, aligned with the Y-axis, are hidden in FIG. 3A by rotors 76.

A pair of weights 84 are attached to the bottom of micromirror 46 at opposite corners. The weights may comprise any suitable material and may be fastened (using a suitable glue, for example) to the micromirror in the appropriate locations. Alternatively, the weight asymmetry can be created by etching away appropriate portions of the backside of the mirror, using standard etching processes, for example, such as DRIE or wet etching. The purpose of the weights is to introduce mechanical asymmetry about the axes of rotation of the micromirror. The particular shape and locations of the weights in FIG. 3A are thus shown solely by way of example, and any design that provides a suitable asymmetric weight distribution about the axes may similarly be used.

The asymmetric weight distribution induces mechanical coupling between the axes of rotation by changing the axis of rotational inertia of micromirror 46. The new axis of inertia thus created for the fast scan direction is not precisely perpendicular to the axis of the slow scan. Therefore, as base 72 rotates about the Y-axis due to the operation of the magnetic drive, weights 84 will cause micromirror 46 to wobble about the X-axis on spindles 70. The mechanical design of the micromirror, spindles and weights is chosen to give the desired scan frequency and amplitude under these conditions. Adding a high-frequency electrical drive to the micromirror at the resonant frequency for the fast scan rotation will cause significant mechanical energy to be transferred to this scan direction, thus generating the desired two-dimensional scan of the micromirror.

Figure 3B:
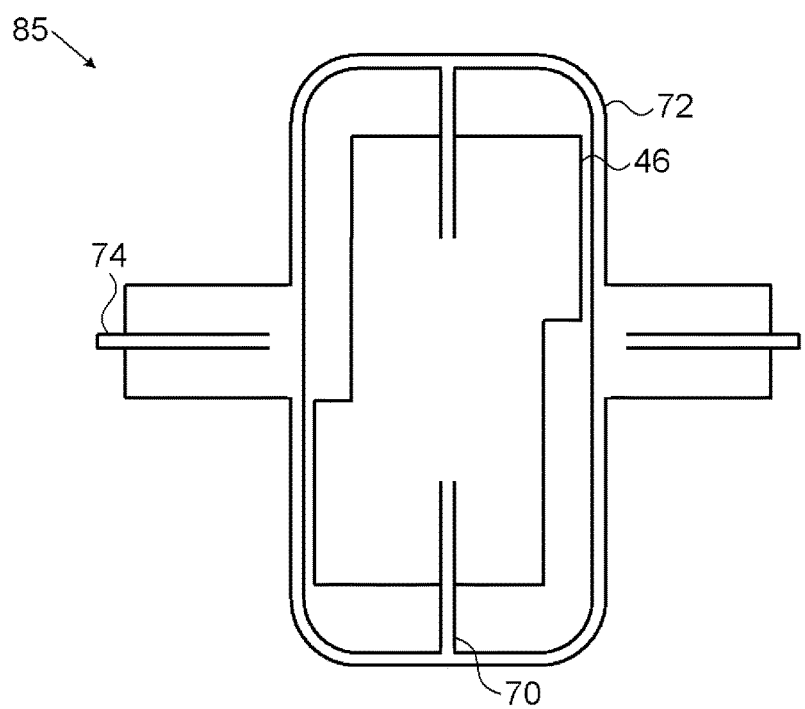
FIG. 3B is a schematic frontal view of a part of a micromirror assembly, in accordance with another embodiment of the present invention.

FIG. 3B is a schematic frontal view of a part of a micromirror assembly 85, in accordance with another embodiment of the present invention. In this case, an asymmetric weight distribution is formed by appropriately etching the shape of micromirror 46 in the course of the photolithographic production process so as to provide an asymmetric weight distribution. The shaping of the mirror in this case provides the desired mechanical coupling between the fast and slow axes of rotation.

Electrical and Magnetic Drive Schemes

The figures described below illustrate various schemes that may be used to drive dual-axis scanning of a micromirror, in accordance with several different embodiments of the present invention. For convenience and clarity, these embodiments are described with reference to micromirror 46 and the associated MEMS structure that is presented above. These principles of these embodiments, however, may likewise be applied, mutatis mutandis, to dual-axis scanning mirrors of other sorts, such as some of the devices that are described in the references cited above in the Background section.

Figure 4:
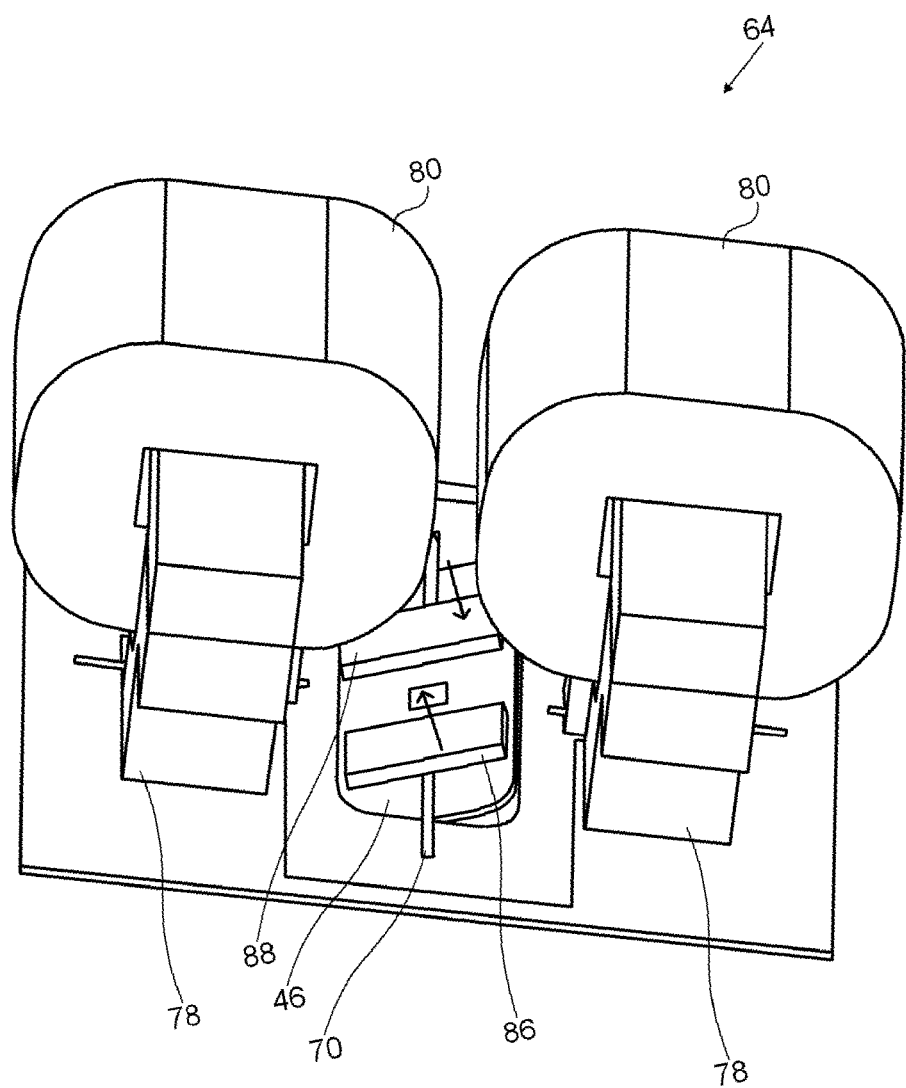
FIG. 4 is a schematic, pictorial illustration of a MEMS scanner, seen from below, in accordance with an embodiment of the present invention.
Figure 15:
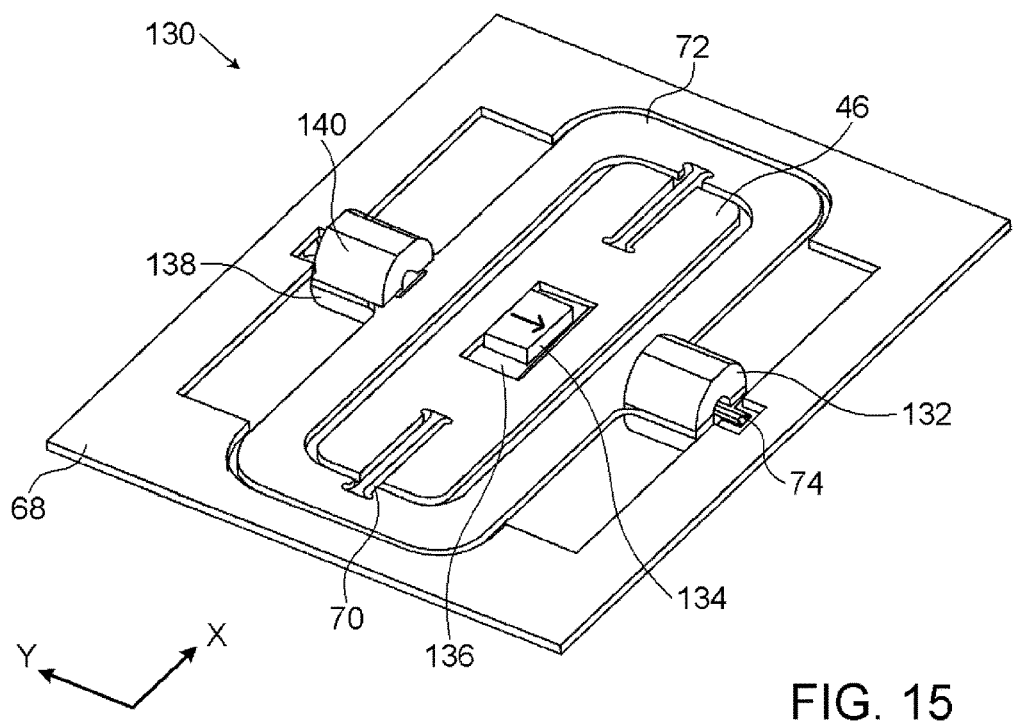
FIG. 15 is a schematic bottom view of a micromirror assembly, in accordance with a further embodiment of the present invention.

FIG. 4 is a schematic bottom view of MEMS scanner 64, in accordance with another embodiment of the present invention. In this embodiment, a pair of magnetic strips 86, 88 are fixed to the underside of micromirror 46. The strips have opposing polarities, as indicated by the arrows in the figure, with the north pole of strip 86 oriented downward and that of strip 88 oriented upward. It can be advantageous in this sort of embodiment to recess strips 86, 88 within the volume of micromirror so that the center of mass of the micromirror is close to the axis defined by spindles 70. An embodiment of this sort is shown in FIG. 15.

The currents driving coils 80 include a differential component at the resonant frequency of the micromirror, i.e., the waveforms driving the coils at this frequency are 180° out of phase with one another. This differential component gives rise to a magnetic field component along the Y-axis between cores 78, which is inhomogeneous in the X-direction and alternates in direction at the driving frequency. In other words, at a given point in time, the field may point in the positive Y-direction at magnetic strip 86 and in the negative Y-direction at magnetic strip 88, with point directions alternating at the resonant frequency. Interaction of this magnetic field with the magnetization of magnetic strips 86, 88 gives rise to an alternating rotational force exerted on micromirror 46 about spindles 70, thus causing the micromirror to rotate as shown in the figure.

More generally, the coil and driving current configurations may be adapted by other means to create net forces and torques in the intended direction. Magnetic or ferromagnetic material may be applied to the mirror itself in other geometries (other than the specific geometries that are shown in the figures), while the driving force is created by stationary coils. There may be one or more such magnets, with any suitable polarities, or ferromagnetic material (with no inherent polarity). The driving electromagnetic fields can be adjusted in each case to create driving forces in the appropriate directions, as will be apparent to those skilled in the art upon reading the present patent application. All such alternative configurations of magnets and drives are considered to be within the scope of the present invention.

Figure 5:
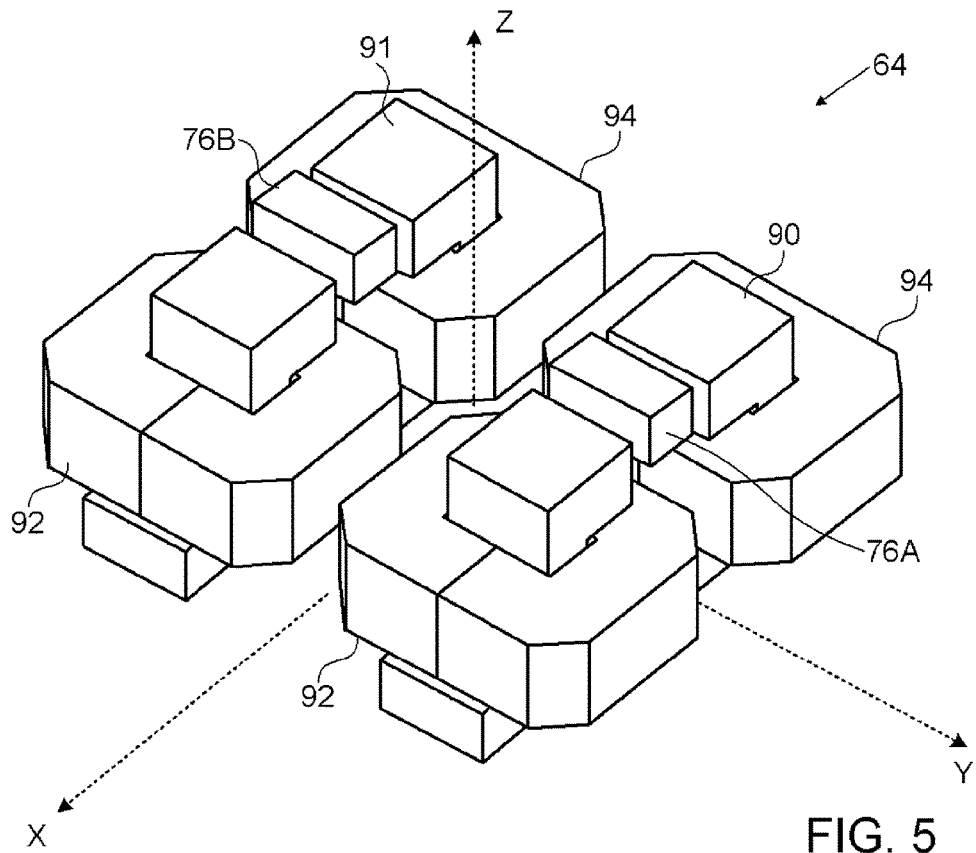
FIG. 5 is a schematic, pictorial illustration showing stators and rotors of a MEMS scanner, in accordance with an embodiment of the present invention.

FIG. 5 is a schematic pictorial view showing elements of MEMS scanner 64 in accordance with yet another embodiment of the present invention. In this embodiment, micromirror 46 itself is omitted for visual clarity, and its location is indicated by rotors 76A and 76B, which are attached to the underside of gimbaled base 72 of the micromirror as shown in the preceding figures. The stator assembly of the MEMS scanner comprises two cores 90, 91, each having a pair of pole pieces that define an air gap in which the corresponding rotor 76A or 76B is suspended. (The term "pole piece" is used in the present description and in the claims in the conventional sense, to denote the part of the magnetic core that is adjacent to the air gap.) Each core 90, 91 is wound with two coils 92, 94 on opposing sides of the air gap of the core. The effect of this sort of arrangement, in generating magnetic circuits that drive the motion of the rotors, is illustrated in the figures that follow.

Figure 6:
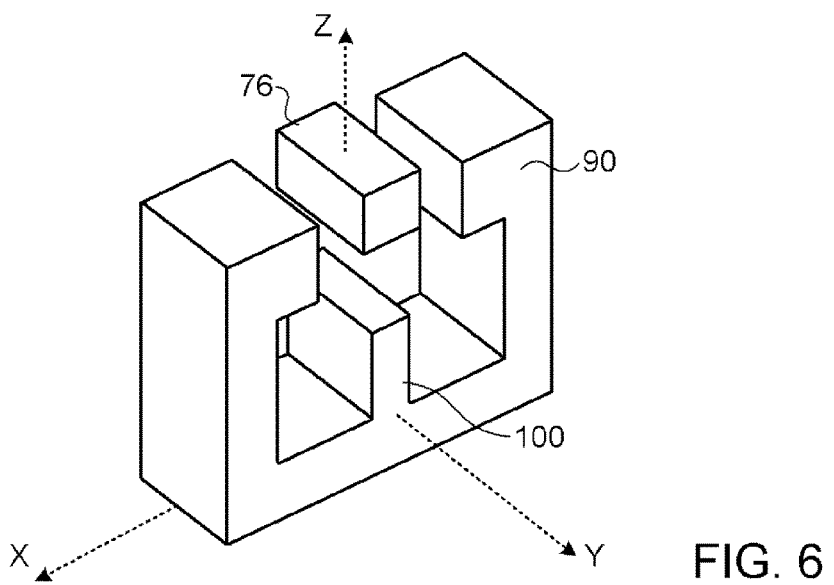
FIG. 6 is a schematic, pictorial illustration showing details of a stator and rotor of a MEMS scanner, in accordance with another embodiment of the present invention.

FIG. 6 schematically shows details of structure of one stator core 90 and rotor 76 that are used in a magnetic drive, in accordance with another embodiment of the present invention. This is one of a pair of rotors and cores, as in the preceding embodiment. The coils and micromirrors are omitted from the figure in order to give a clear view of the shape of the core, including the air gap between the poles and an addition pole in the form of a protruding "tooth" 100, whose upper end adjoins and contains the air gap from below. The function of this tooth is explained below.

The rectangular profile of rotor 76 in this and other embodiments can be advantageous, inter alia, in that it gives rise to a rotational moment of the rotor about the Y-axis that grows as the angle of rotation grows from the central position shown in the figure, due to attraction by the pole pieces of the stator core that are located to either side of the rotor. This rotational moment counteracts the spring force of spindles 74, which increases as the rotor turns about the spindle (Y) axis, and thus reduces the force that must be exerted in rotating the mirror about spindles 74. Alternatively, other geometrical designs of the rotors and the stator core may be used to engender the desired rotational characteristics.

Figure 7:
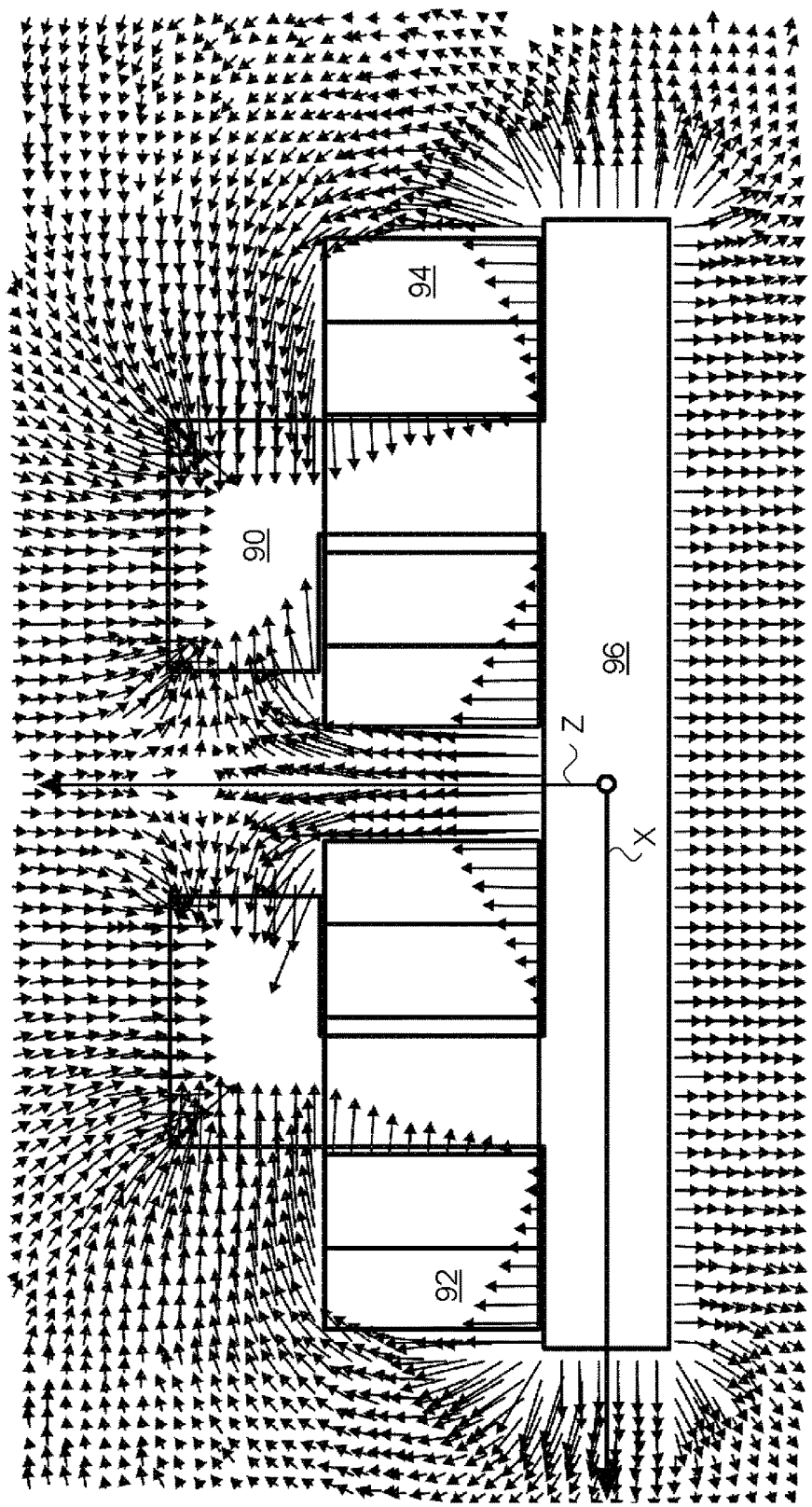
FIG. 7 is a schematic side view of one of the stators of FIG. 5, including arrows indicating the magnetic vector field generated by the stator in accordance with an embodiment of the present invention.

FIG. 7 is a schematic side view of core 90, as shown pictorially in FIG. 5, in accordance with an embodiment of the present invention. In this embodiment, core 90 comprises an enlarged base 96, with coils 92 and 94 wound on the core above the base. Core 91 (FIG. 5) will have a similar form and behavior. FIG. 7 also includes arrows indicating the flux of the magnetic circuit in the plane of the figure (including the flux in the air gap between the poles of core 90) when the coils are driven with appropriate currents. Alternatively, however, other core and coil configurations may be used and are considered to be within the scope of the present invention, as noted earlier.

The high-frequency magnetic field generated in and around core 90, as indicated by the arrows, includes a vertical (Z-direction) component in the air gap between the poles of the core. This field component alternates in direction at the frequency of the currents driving coils 92 and 94. Coils 92 and 94 on core 91 are driven with opposite phase to the currents in the counterpart coils 92, 94 of core 90, so that the Z-direction field components at any moment in the air gaps of cores 90 and 91 are likewise opposite. Thus, the field will push rotor 76A upward while pushing rotor 76B downward, and vice versa, alternating at the drive frequency of the high-frequency waveform. These opposing Z-direction movements of the rotors cause micromirror 46 to rotate on spindle 70 at this same frequency, which is typically chosen to be the resonant frequency of the micromirror. (More precisely, in terms of Newton's Laws, inertia causes micromirror 46 to tend to remain in place while base 72 moves, thereby creating elastic energy transfer from the rotors to the micromirror, through the torsion arms of spindles 70; this principle is behind the operation of a number of the embodiments described herein.) At the same time, the low-frequency current component, driven in phase through all of coils 92 and 94, i.e., with the current flowing in the same direction in all the coils, gives rise to an alternating X-direction magnetic field within the air gaps, thus causing rotors 76A, 76B to rotate about the Y-axis and in this manner rotate base 72.

Figure 8:
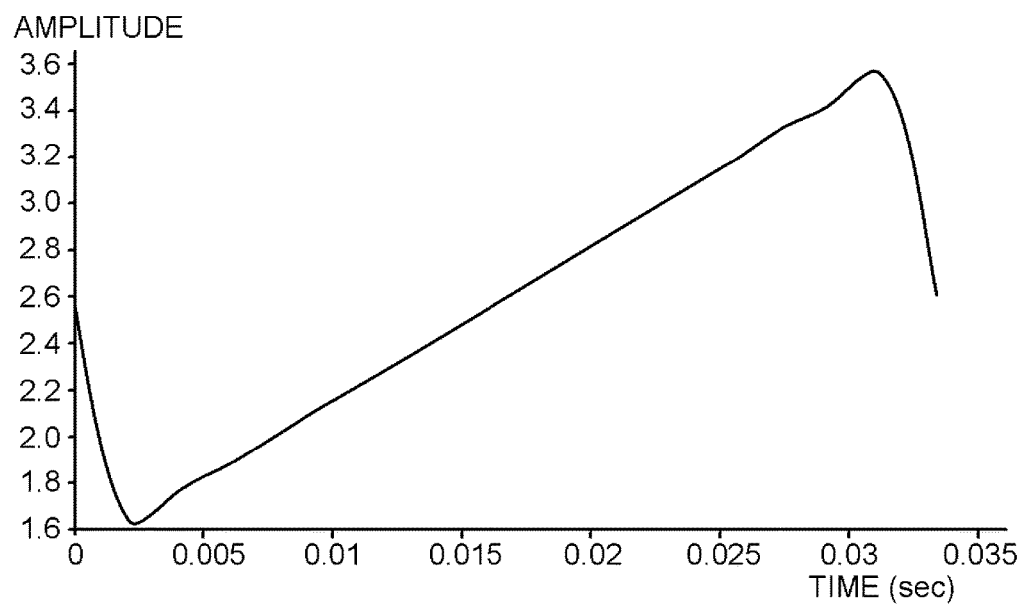
FIGS. 8-10 are schematic plots of current waveforms that are used to drive a stator of a MEMS scanner, in accordance with an embodiment of the present invention.
Figure 9:
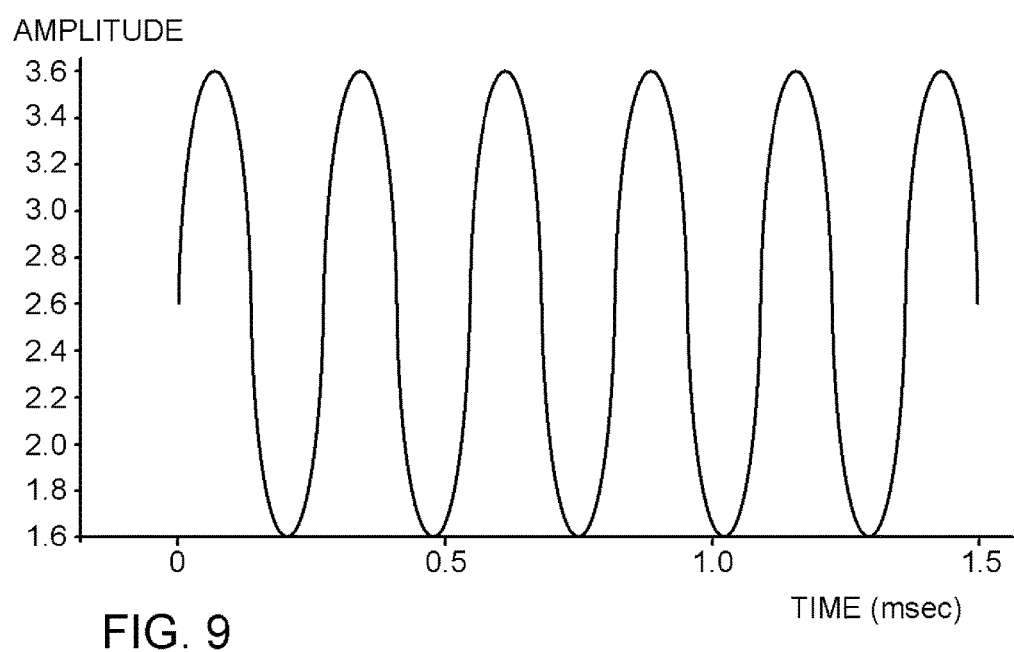
Figure 10:
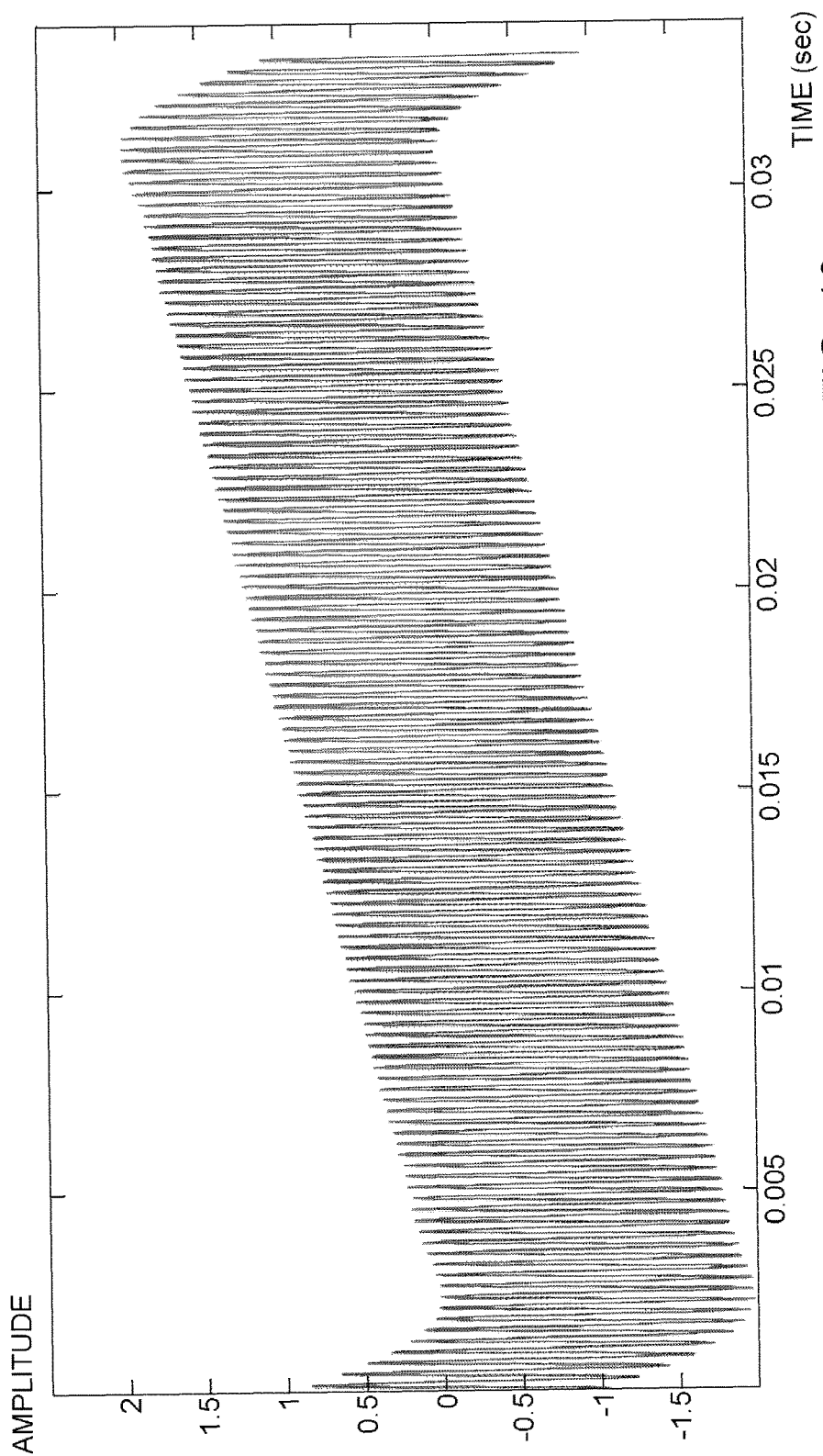

FIGS. 8-10 schematically illustrate typical current waveforms that are used to drive coils 92 and 94, in accordance with an embodiment of the present invention. As noted above, all of the coils are driven in phase with a low-frequency waveform, such as the sawtooth shown in FIG. 7. The coils are driven in opposite phases by a high-frequency waveform, such as the sinusoid shown in FIG. 8. Coils 92 and 94 on each core are driven 180° out of phase relative to one another; and each coil 92, 94 on core 90 is driven 180° out of phase relative to its counterpart coil 92, 94 on core 91. Each coil is thus driven by the superposition of waveforms that is shown in FIG. 9, with variations in the phase of the high-frequency component from coil to coil, thus generating rotation of the micromirror about two axes using a stationary set of coils.

Figure 17:
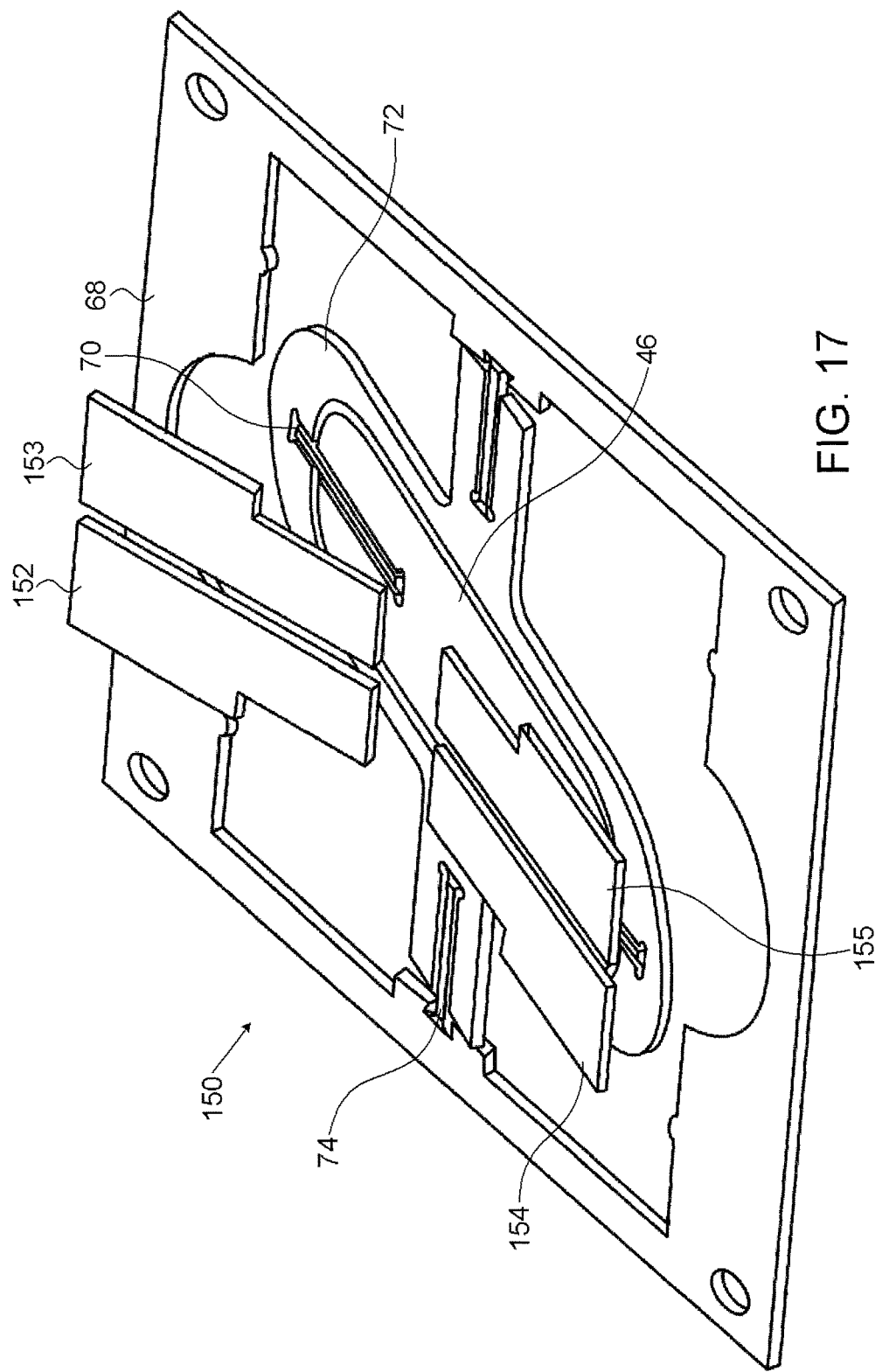
FIG. 17 is a schematic bottom view of a micromirror assembly with a capacitive sensor, in accordance with an embodiment of the present invention.

The currents applied to coils 92 and 94 (and similarly, the currents applied in other embodiments of the present invention) may be generated and controlled using any suitable technique that is known in the art, including both open-loop and closed-loop controls. In the latter category, drive circuit 82 may receive feedback regarding the amplitude and/or frequency of the mirror scan and may control the current accordingly. The novel capacitive sensing scheme that is shown in FIG. 17 may be used for this purpose, for example, but other sorts of sensing schemes that are known in the art may alternatively be used, such as the closed-loop schemes using sensors of various sorts that are described in the above-mentioned U.S. Pat. No. 7,952,781.

Figure 11A:
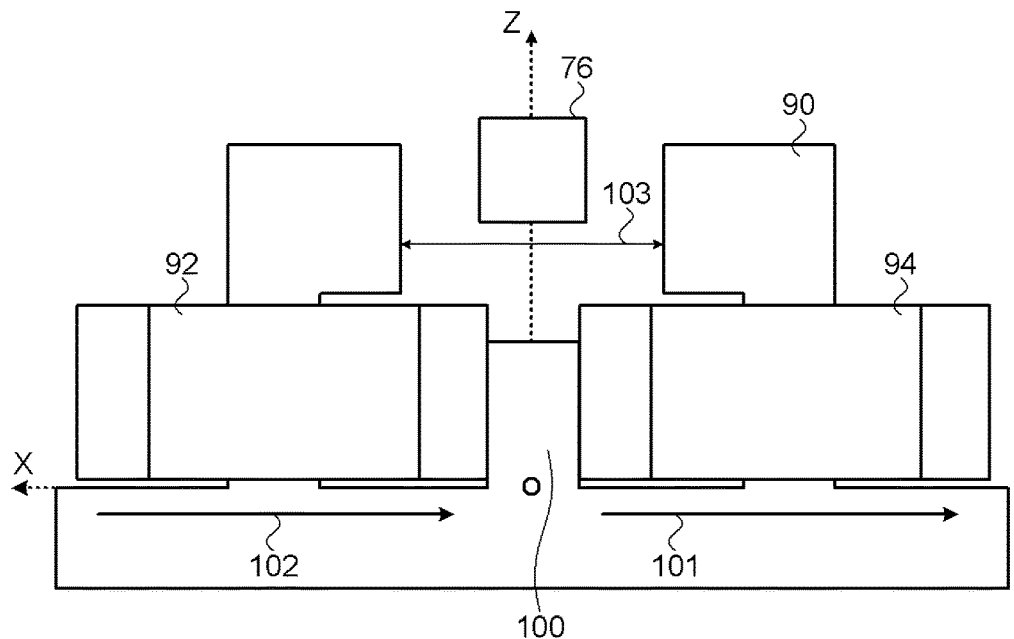
FIGS. 11A and 11B are schematic side views of the stator and rotor of FIG. 6, showing current used in driving the stator and field directions generated as a result, in accordance with an embodiment of the present invention.
Figure 11B:
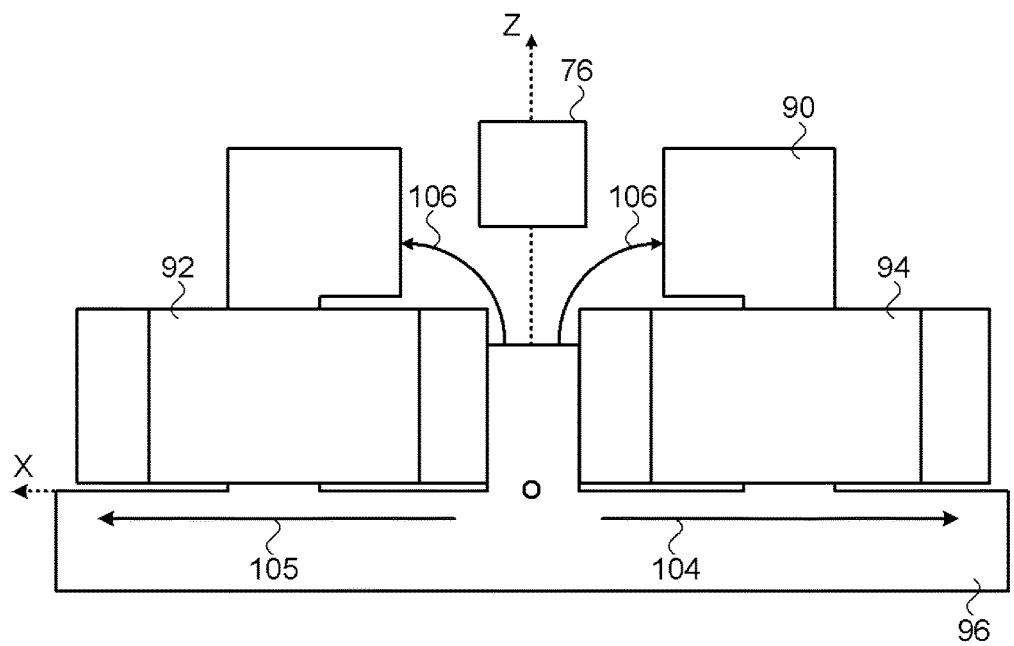

FIGS. 11A and 11B are schematic side views of the stator core 90 and rotor 76 of FIG. 6, showing currents used in driving the stator and field directions generated as a result, in accordance with an embodiment of the present invention. As illustrated by arrows 101 and 102 in FIG. 11A, the low-frequency (slow axis) currents flow in phase through coils 92 and 94 on both stator cores, giving a horizontal (X-direction) magnetic flux through the air gap, as indicated by an arrow 103. This X-direction field alternates at the frequency of the in-phase current and causes both rotors to rotate about the Y-axis.

On the other hand, as shown in FIG. 11B, the high-frequency (fast axis) currents flow through coils 92 and 94 in anti-phase, as indicated by arrows 104 and 105. These currents give rise to an alternating vertical (Z-direction) magnetic flux, indicated by arrows 106, which causes rotors 76A and 76B to move in opposite directions along the Z-axis and thus drive the high-frequency scan of the micromirror. Protruding tooth 100 below the air gap enhances the this field and hence the driving force for fast rotation about the X-axis.

Figure 12:
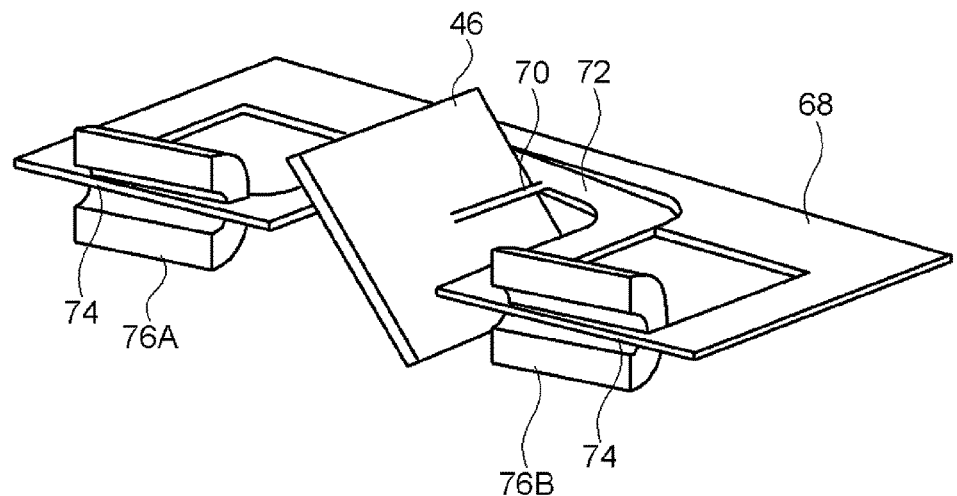
FIG. 12 is a schematic, cutaway view of a scanning micromirror, in accordance with an embodiment of the present invention.

FIG. 12 is a schematic, cutaway view of scanning micromirror 46 and associated parts of a micromirror assembly, in accordance with an embodiment of the present invention.

This figure illustrates how the currents and field that are shown in FIG. 11B drive the fast rotation of micromirror 46. The alternating Z-direction flux in the air gap of stator core 90 causes rotors 76A and 76B to vibrate up and down, in opposing phases, along the Z-axis at the frequency of the alternating current. As a result, spindles 74 flex in opposing directions, causing base 72 to vibrate, as well, as shown in the figure. Because the frequency of vibration is equal or close to the resonant rotational frequency of micromirror 46 about spindles 70, the twist of the spindles due to vibration of base 72 causes the micromirror to rotate back and forth about the X-axis with high amplitude.

Figure 13:
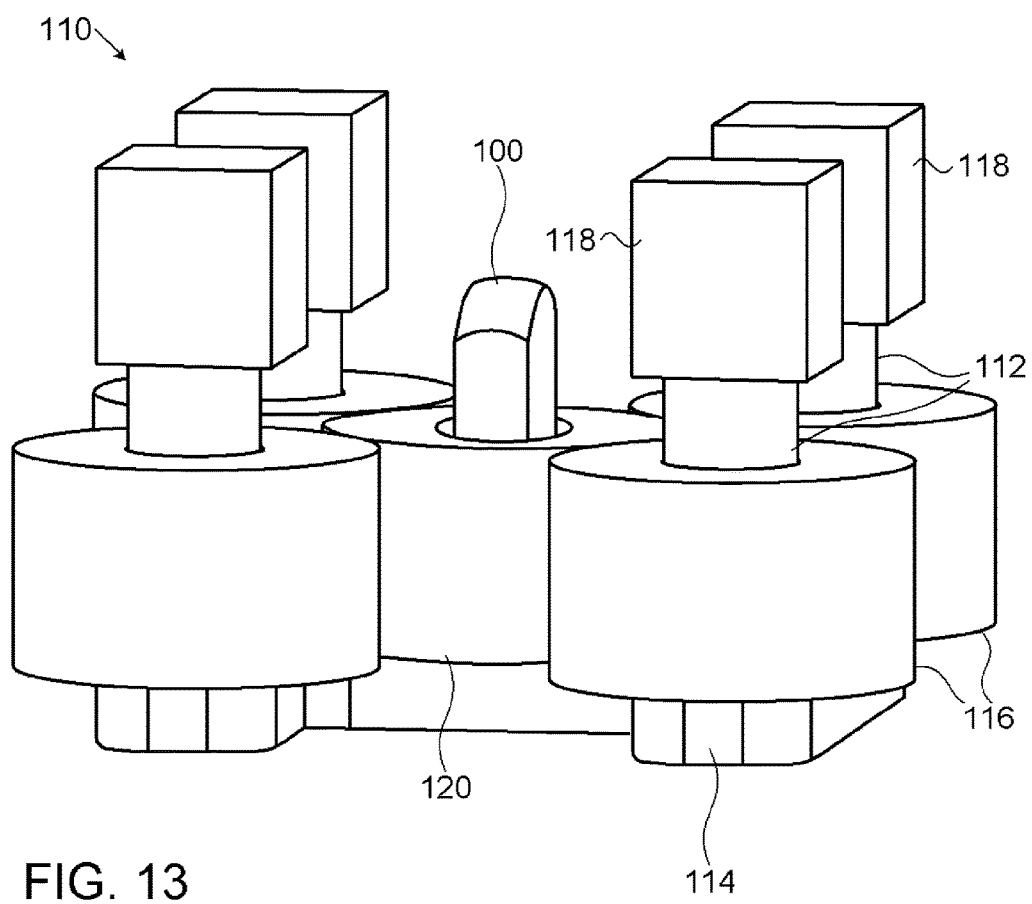
FIG. 13 is a schematic, pictorial illustration of a stator of a MEMS scanner, in accordance with an alternative embodiment of the present invention.

FIG. 13 is a schematic, pictorial illustration of a stator 110, in accordance with a further embodiment of the present invention. Stator 110 includes central tooth 100, which in this embodiment is wound with its own coil 120. This coil is energized so as to drive the fast-axis rotation of micromirror 46. Stator 110 is based on a magnetic core, which comprises two pairs of posts 112 on a base 114, together with tooth 100. Pole pieces 118 at the tops of posts 112, along with tooth 100, define the air gap in which the rotors of the micromirror assembly are situated during operation. Coils 116 on posts 112 are driven in phase with alternating currents at the frequency of slow-axis rotation of gimbaled base 72 and thus turn the rotors in the areas of the air gap between pole pieces 118.

Coil 120, however, is driven at the much higher frequency of (resonant) fast-axis rotation of the micromirror. As a result, tooth 100 generates a high-frequency magnetic field, which interacts with a magnet or magnets that are mounted on micromirror 46 itself and thus causes the micromirror to rotate about spindles 70 relative to base 72. FIG. 15 shows a configuration of micromirror 46 that may be used in this context, with a suitable magnet mounted on the back side of the micromirror.

Figure 14A:
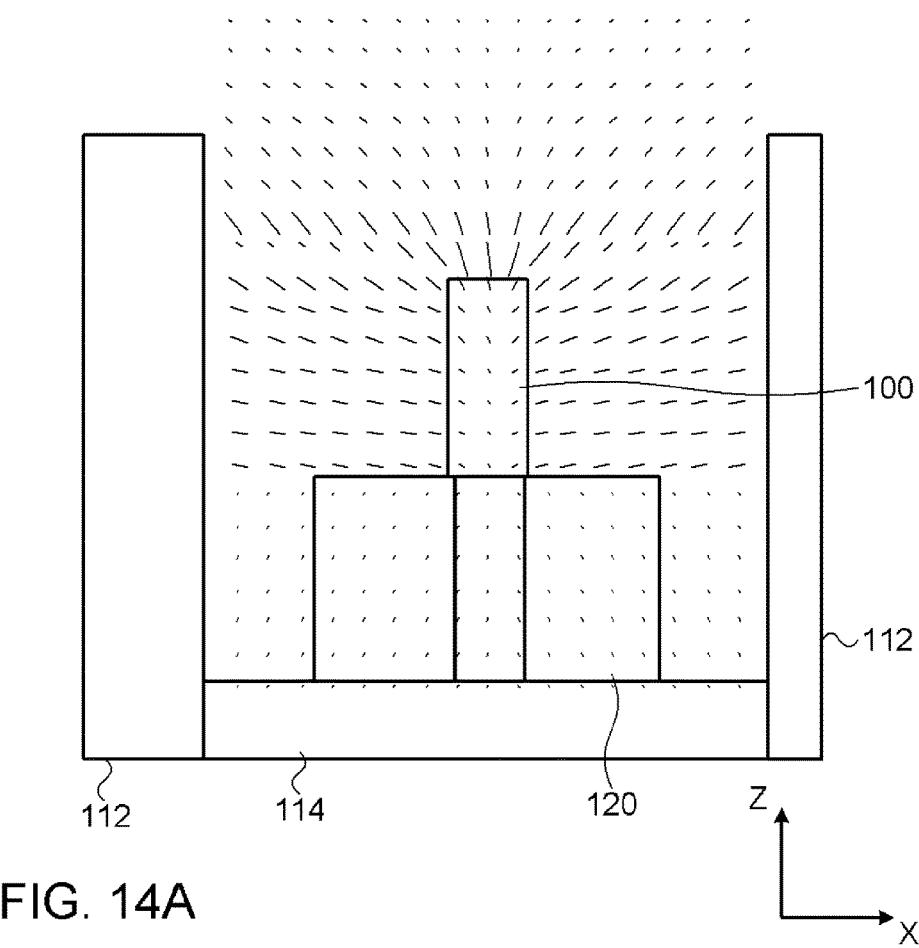
FIG. 14A is a schematic side view of a part of the stator of FIG. 13, illustrating a magnetic field generated by the stator, in accordance with an embodiment of the present invention.

FIG. 14A is a schematic side view of a part of stator 110, absent coils 116, illustrating the magnetic circuit generated in the air gap of the stator due to the current in coil 120 on tooth 100, in accordance with an embodiment of the present invention. The marks in the figure in the space between posts 112 represent the direction and magnitude of the magnetic field at each point in the space.

The geometrical arrangement of tooth 100 and posts 112 causes the magnetic field around the tooth to have the general form of a "fountain," with the lines of magnetic force "spraying" outward from the tooth toward the posts. As the direction of this field alternates, due to the alternating current driven through coil 120, the direction of the magnetic force exerted on micromirror 46 about the axis of spindles 70 likewise alternates, thus causing the micromirror to rotate at the frequency of the alternating current. The upward (Z-direction) field that is shown in this figure interacts with the Y-direction magnetization of a magnet mounted on micromirror 46 (as shown in FIG. 15) to drive rotation of the micromirror about the fast (X-direction) axis defined by spindles 70.

Figure 14B:
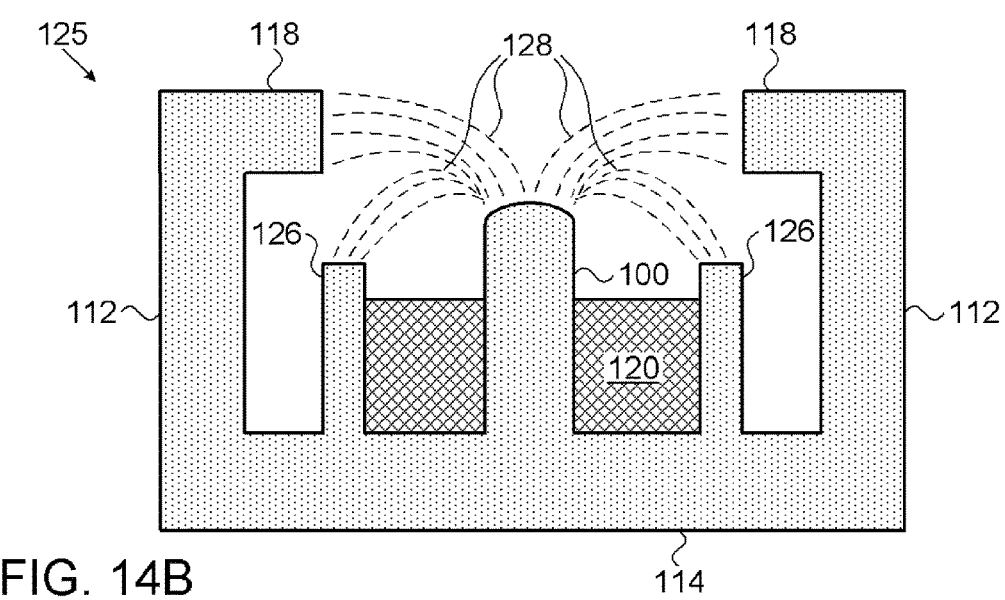
FIG. 14B is a schematic side view of a stator, in accordance with another embodiment of the present invention.

FIG. 14B is a schematic side view of a stator 125, in accordance with another embodiment of the present invention. The structure of stator 125 is similar to that of stator 110, with the addition of two or more auxiliary fingers 126 positioned on base 114 around tooth 100. Fingers 126 further bound and define the air gap of the stator core, located between poles 118, and have the effect to constraining magnetic field lines 128 so that the vertical (Z-direction) component of the field in the air gap is enhanced. As a result, the amplitude of the fast-axis rotation of the micromirror, relative to the driving current, is enhanced, as well.

FIG. 15 schematically illustrates a silicon scanning micromirror assembly 130, in accordance with an embodiment of the present invention. Assembly 130 is seen from the bottom in this figure, i.e., from the side that is adjacent to the stator (which may have the form of stator 110, for example). The reflective (upper) side of micromirror 46 faces into the page in this view. Assembly 130 may be driven by the magnetic forces of stator 110, for example, in the manner described above.

Micromirror 46 in assembly 130 is connected to gimbaled base 72 by spindles 70, while base 72 is connected by spindles 74 to substrate 68, as in the preceding embodiments. In contrast to the simplified illustrations of the embodiments shown in FIGS. 2 and 3, however, magnetic rotors 132 in assembly 130 each comprise upper and lower pieces 138 and 140, which are attached directly to both sides of base 72. Thus, micromirror 46 is balanced between rotors 132, rather than mounted above them. (The embodiments described above could also be implemented in a similar, balanced fashion.) As a result, the plane of the micromirror and its base will be located between the two cores of the stator assembly, rather than above the cores as in the preceding embodiments (as seen in FIG. 2, for example). This balanced configuration of the micromirror is advantageous in terms of mechanical stability, as the axis of rotation of base 72 that is defined by spindles 74 passes through the center of mass of assembly 130.

A magnet 134 is fixed to the lower side of micromirror 46 and interacts with the alternating magnetic field generated by tooth 100 of the stator (as illustrated in FIG. 14A). Magnet 134 is polarized along the Y-axis, as indicated by the arrow in the figure. The interaction of this magnetization with the Z-direction field shown in FIG. 14A provides the force that causes micromirror 46 to rotate about the axis of spindles 70 (the X-axis, i.e., the fast axis).

To enhance the mechanical stability of assembly 130, magnet 134 is mounted in an indentation 136 that is formed in the back side of micromirror 46. The indentation may be formed, for example, by wet etching or by deep reactive ion etching (DRIE) of the silicon. Consequently, the axis of rotation of the micromirror that is defined by spindles 70 passes close to the center of mass of the micromirror with magnet 134 mounted in the indentation. Although it may not be possible to place the center of mass and the center of rotational inertia precisely on the axis of rotation, reducing the distance between these points in the manner described above is still useful in improving the balance and dynamic stability of the rotating micromirror.

Enhancement and Monitoring of Mirror Rotation

Figure 16:
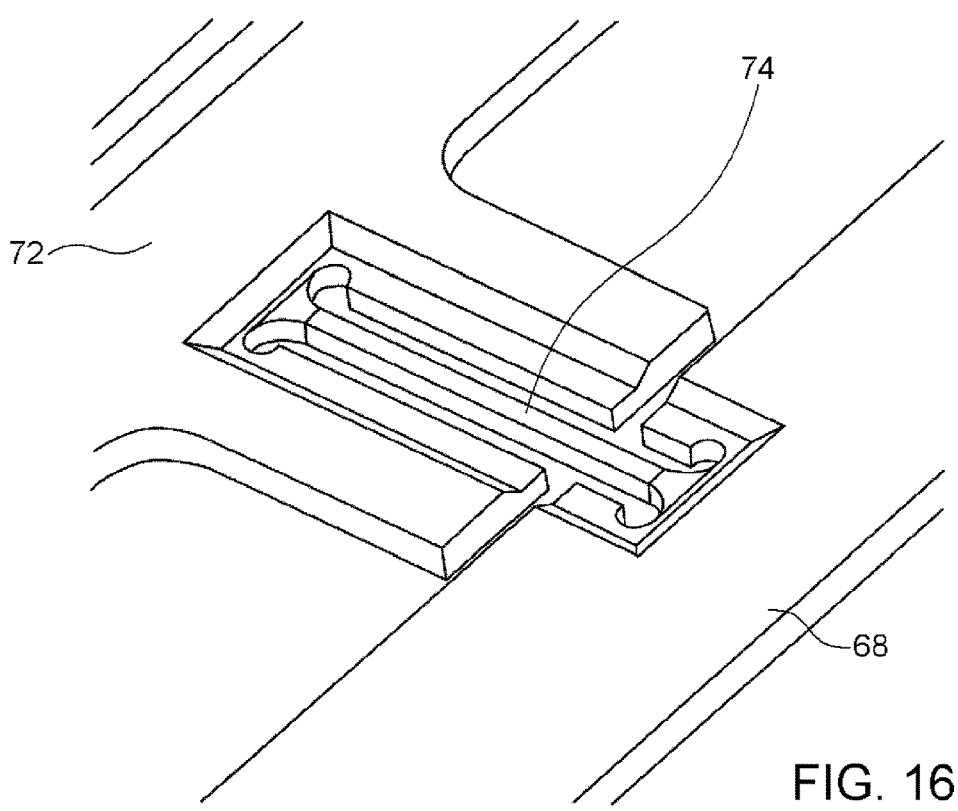
FIG. 16 is a schematic detail view of a MEMS spindle, in accordance with an embodiment of the present invention.

FIG. 16 is a schematic detail view of spindle 74, in accordance with an embodiment of the present invention. To reduce the force that must be applied in rotating base 72 relative to substrate 68 (which is typically not a resonant rotation), it is desirable that spindle 74 be as rotationally flexible as possible. Therefore, the silicon wafer in the area of base 72 surrounding spindle 74 is thinned, by a wet etching process, for example. The shape of the spindle is then defined and cut out of the thinned wafer by photolithography. To strengthen the spindle against breakage, while still maintaining the desired rotational flexibility, the gaps surrounding spindle 74 may be filled with a suitable filler material, such as a flexible polymer, as described in U.S. Provisional Patent Application 61/781,086, which is incorporated herein by reference. Using this approach, it is possible to decouple the design considerations of slow spindles 74 from those of fast spindles 70.

The process that is used to thin the wafer can be critical in designs of the sort shown in FIG. 16. Some processes may tend to cause micro-cracks and roughness in the silicon wafer, which may weaken the spindles; and it is therefore undesirable to thin the spindles using such processes. The wet etching process, however, leaves smooth surfaces, which are beneficial in producing robust spindles with a reduced likelihood of cracking.

FIG. 17 schematically illustrates a capacitive sensor 150 that is used to sense the rotation of micromirror 46, in accordance with an embodiment of the present invention. Sensor 150 comprises sensing plates in the form of four quadrants 152, 153, 154 and 155, which are typically made from a conductive material. As base 72 rotates about spindles 74 (i.e., about the slow axis), as shown in the figure, the capacitance between micromirror 46 and quadrants 154 and 155 increases, while the capacitance between the micromirror and quadrants 152 and 153 decreases. When the base rotates back toward the opposite extreme of its motion, the capacitance between the micromirror and quadrants 152 and 153 increases, while that between the micromirror and quadrants 154 and 155 decreases.

A controller (not shown in the figures) measures these changes in capacitance continuously, by methods of measurement that are known in the art. Based on the changes in capacitance, the controller is able to monitor the frequency and amplitude (i.e., angular range) of rotation of base 72 about the slow axis.

By the same token, rotation of micromirror 42 about spindles 70 will cause changes in the capacitance between the micromirror and quadrants 152 and 154 relative to quadrants 153 and 155; and these changes may likewise be measured to monitor the rotation of the micromirror about the fast axis.

Although it is possible to mount the elements of a capacitive sensor for this purpose in a plane that is parallel to substrate 68, this mounting scheme may limit the range of motion of micromirror 46 unless the sensor elements are mounted far away from the micromirror (in which case the capacitance, and hence the useful signal for measuring rotation, is drastically reduced). To overcome this limitation, quadrants 152, 153, 154 and 155 are angled, as shown in FIG. 17, so that the quadrants are closest to the plane of substrate 68 in the area of the axis of rotation of the micromirror and slope away from this plane at locations farther from the axis. In the configuration shown in the figure, quadrants 152 and 153 are mutually parallel, as are quadrants 154 and 155, thus defining a "roof" with its ridgeline near the axis of spindles 74. Although sensor 150 is illustrated in this embodiment in the context of a dual-axis scanning micromirror assembly, this sort of roof-shaped sensor configuration may likewise be used in sensing the rotation of single-axis scanners.

Alternatively, quadrants 152 and 153 may be angled relative to one another, as well, and likewise quadrants 154 and 155, so that the four quadrants together define a pyramidal shape, with its peak near the center of the micromirror, where the axes of rotation intersect.

Although capacitive sensor 150 is described, for the sake of clarity, with reference to micromirror 46, sensors of this sort may similarly be applied, mutatis mutandis, in sensing and tracking the motion of scanning mirrors of other types, such as those described in the references cited above in the Background section. By the same token, other inventive features described above with regard to techniques for driving a scanning mirror may similarly be applied to other mirror designs.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Optical apparatus, comprising:
   a stator assembly, which comprises:
      a core containing an air gap; and
      one or more coils comprising conductive wire wound on the core so as to cause the core to form a magnetic circuit through the air gap in response to an electrical current flowing in the conductive wire;
   a scanning mirror assembly, comprising:
      a support structure;
      a base, which is mounted to rotate about a first axis relative to the support structure; and
      a mirror, which is mounted to rotate about a second axis relative to the base;
   at least one rotor, which comprises one or more permanent magnets, which are fixed to the scanning mirror assembly and which are positioned in the air gap so as to move in response to the magnetic circuit; and
   a driver, which is coupled to generate the electrical current in the one or more coils at one or more frequencies selected so that motion of the at least one rotor, in response to the magnetic circuit, causes the base to rotate about the first axis at a first frequency while causing the mirror to rotate about the second axis at a second frequency.

2. The apparatus according to claim 1, wherein the mirror is weighted asymmetrically about at least the first axis so as to couple a first rotation of the mirror about the first axis to a second rotation of the base about the second axis.

3. The apparatus according to claim 2, wherein the second frequency is a resonant frequency of rotation of the mirror about the second axis, and wherein the driver is coupled to generate the electrical current at the first frequency.

4. The apparatus according to claim 1, wherein the core comprises first and second pairs of pole pieces, defining the air gap, and
   wherein the at least one rotor comprises first and second rotors, which are respectively fixed to opposing first and second sides of the base and are respectively positioned in the air gap between the first and second pairs of the pole pieces.

5. The apparatus according to claim 4, wherein the driver is configured to drive the one or more coils with a first current at the first frequency and a second current at the second frequency.

6. The apparatus according to claim 5, wherein the one or more coils comprise first coils wound adjacent to the pole pieces in the first pair and second coils wound adjacent to the pole pieces in the second pair, and
   wherein the drive circuit is configured to drive the first and second coils in phase at the first frequency and in opposing phases at the second frequency.

7. The apparatus according to claim 1, wherein the one or more permanent magnets of the at least one rotor comprise first and second permanent magnets fixed to the base on opposing sides of the mirror.

8. The apparatus according to claim 7, wherein each of the first and second permanent magnets comprises respective upper and lower pieces, which are mounted on opposing surfaces of the base so that a center of mass of the first and second permanent magnets is located on the first axis.

9. The apparatus according to claim 7, wherein the one or more permanent magnets of the at least one rotor comprise at least a third permanent magnet fixed to the mirror.

10. The apparatus according to claim 1, wherein the scanning mirror assembly comprises a silicon wafer formed as a microelectromechanical systems (MEMS) device, which comprises first spindles, etched from the silicon wafer, connecting the base to the support structure along the first axis and second spindles, etched from the silicon wafer, connecting the mirror to the base along the second axis.

11. The apparatus according to claim 10, wherein the second spindles are formed so that the mirror rotates resonantly about the second axis at the second frequency.

12. The apparatus according to claim 10, wherein the first spindles are formed so that rotation of the base about the first spindles is a non-resonant rotation, and wherein the wafer is thinned in a vicinity of the first spindles so as to increase a flexibility of the first spindles.

13. The apparatus according to claim 1, and comprising a capacitive sensor, comprising at least first and second plates, which are positioned in proximity to the mirror on opposite sides of the first axis and are angled relative to a plane of the support structure such that the plates are closest to the plane in a location adjacent to the first axis and slope away from the plane at locations farther from the first axis.

14. The apparatus according to claim 1, and comprising:
a transmitter, which is configured to direct pulses of light to reflect from the mirror while the mirror and the base rotate, whereby the light is scanned over a scene; and
a receiver, which is configured to receive the pulses of the light reflected from the scene so as to measure a time of flight of the pulses.

15. Optical apparatus, comprising:
a mirror assembly, comprising a mirror, which is mounted to rotate about an axis relative to a support structure; and
a capacitive sensor, comprising at least first and second plates, which are positioned in proximity to the mirror on opposite sides of the axis and are angled relative to a plane of the support structure such that the plates are closest to the plane in a location adjacent to the axis and slope away from the plane at locations farther from the axis.

16. The apparatus according to claim 15, wherein the mirror is mounted so as to rotate about first and second axes, which are mutually perpendicular, and
wherein the at least first and second plates of the capacitive sensor comprise four plates, which together define a pyramidal shape, having a peak adjacent to a center point at which the axes intersect.

17. A method for scanning, comprising:
providing a stator assembly, which comprises a core containing an air gap, and one or more coils comprising conductive wire wound on the core so as to cause the core to form a magnetic circuit through the air gap in response to an electrical current flowing in the conductive wire;
providing a scanning mirror assembly, comprising a support structure, a base, which is mounted to rotate about a first axis relative to the support structure, and a mirror, which is mounted to rotate about a second axis relative to the base;
fixing at least one rotor, which comprises one or more permanent magnets, to the scanning mirror assembly;
mounting the scanning mirror assembly on the stator assembly so that the one or more permanent magnets are positioned in the air gap so as to move in response to the magnetic circuit; and
driving the one or more coils with an electrical current at one or more frequencies selected so that motion of the at least one rotor, in response to the magnetic circuit, causes the base to rotate about the first axis at a first frequency while causing the mirror to rotate about the second axis at a second frequency.

* * * * *